(12) United States Patent
Sugahara et al.

(10) Patent No.: US 7,906,942 B2
(45) Date of Patent: Mar. 15, 2011

(54) CONTROL CIRCUIT OF DC-DC CONVERTER WITH SYNCHRONOUS RECTIFIER ADJUSTING SIGNAL TO IMPROVE EFFICIENCY AT LIGHT LOADS AND CONTROL METHOD THEREOF

(75) Inventors: Satoshi Sugahara, Nagano (JP); Kouhei Yamada, Nagano (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 353 days.

(21) Appl. No.: 11/878,936

(22) Filed: Jul. 27, 2007

(65) Prior Publication Data
US 2008/0049473 A1 Feb. 28, 2008

(30) Foreign Application Priority Data
Jul. 28, 2006 (JP) ................. 2006-207008

(51) Int. Cl.
*G05F 1/613* (2006.01)
(52) U.S. Cl. .................. 323/223; 363/127; 323/288
(58) Field of Classification Search .............. 323/223, 323/282, 288; 363/127, 21.06, 21.14
See application file for complete search history.

(56) References Cited

U.S. PATENT DOCUMENTS

| | | | |
|---|---|---|---|
| 5,410,467 A * | 4/1995 | Smith et al. | 363/131 |
| 5,481,178 A | 1/1996 | Wilcox et al. | |
| 5,912,552 A * | 6/1999 | Tateishi | 323/285 |
| 6,815,936 B2 * | 11/2004 | Wiktor et al. | 323/282 |
| 6,992,906 B1 * | 1/2006 | Herbert | 363/127 |
| 7,279,877 B1 * | 10/2007 | Tseng | 323/284 |

FOREIGN PATENT DOCUMENTS

JP 06-303766 10/1994

* cited by examiner

*Primary Examiner* — Harry Behm
(74) *Attorney, Agent, or Firm* — Rabin & Berdo, PC

(57) ABSTRACT

A DC-DC converter of a synchronous rectifier type, a control circuit thereof and control method thereof, facilitates detecting and interrupting negative inductor current IL with low power consumption, high accuracy and a simple configuration and facilitates improving the efficiency under a light load. An ON-period decision circuit determines whether an ON-period of the synchronous rectifier switch is too long or too short. An ON-period adjustment circuit generates a signal for adjusting the ON-period, during which the synchronous rectifier switch is ON, based on the decision of the ON-period decision part. A delay circuit adjusts the length of the delay, from the time when a signal changing the ON and OFF states of the synchronous rectifier switch changes to ON, to the time when the synchronous rectifier switch is forcibly turned off based on the adjusting signal.

24 Claims, 21 Drawing Sheets

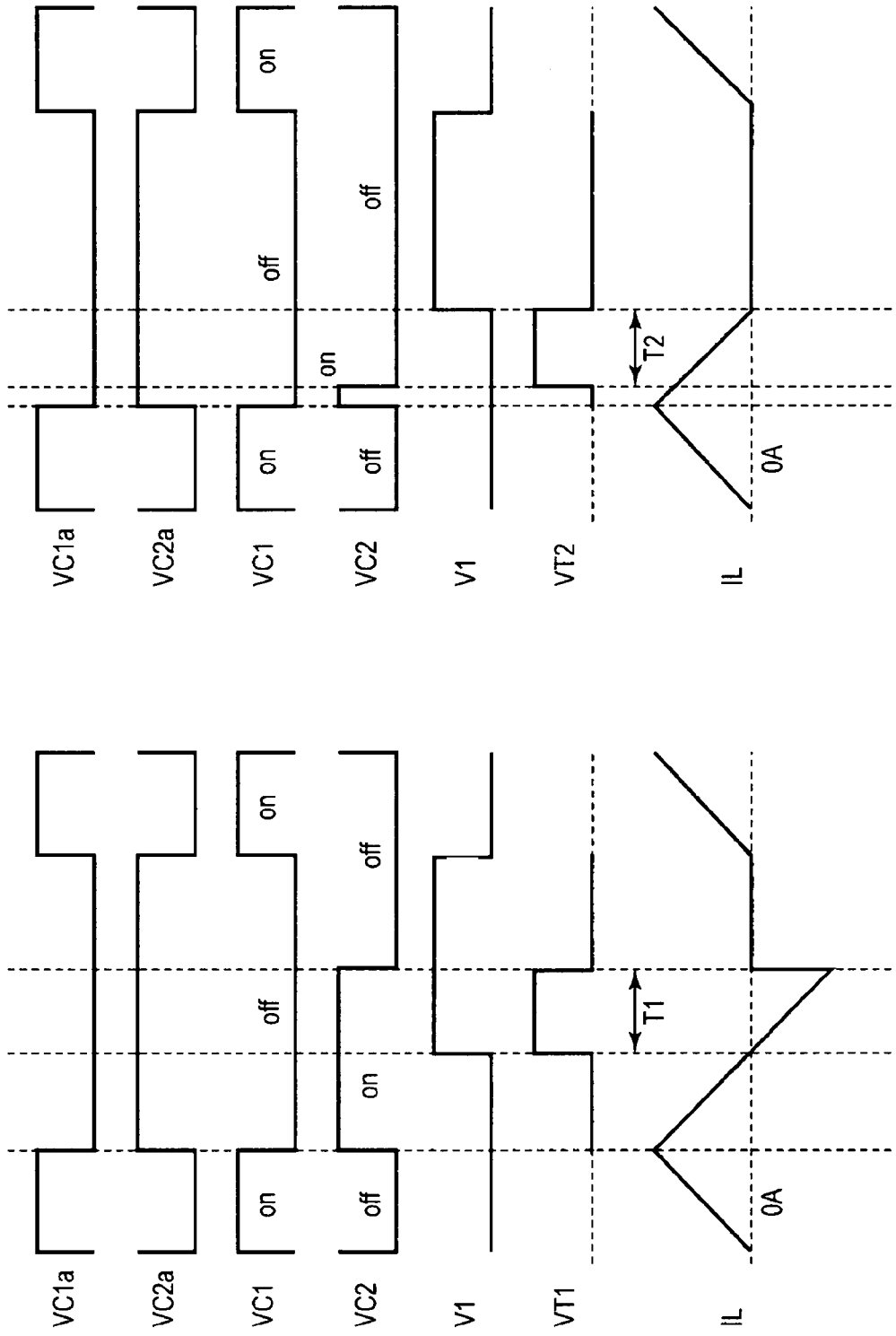

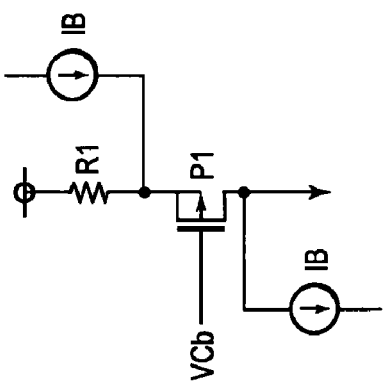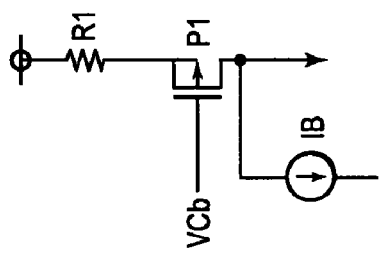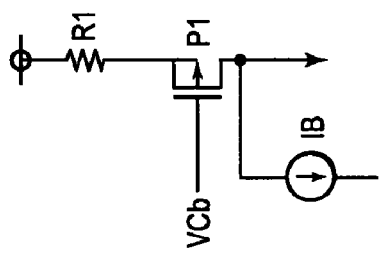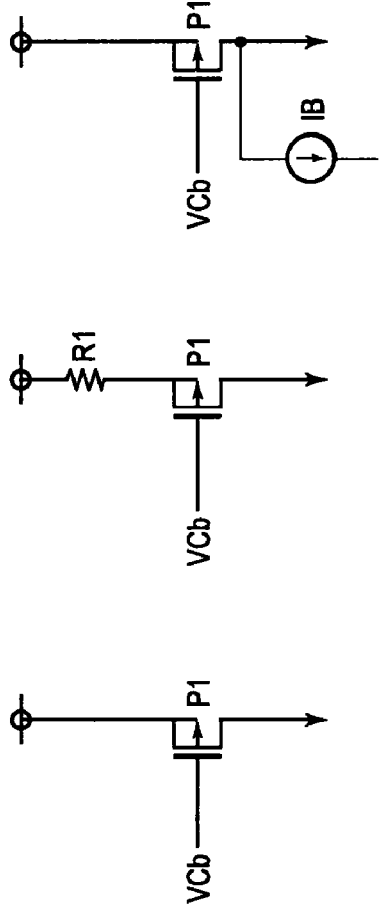

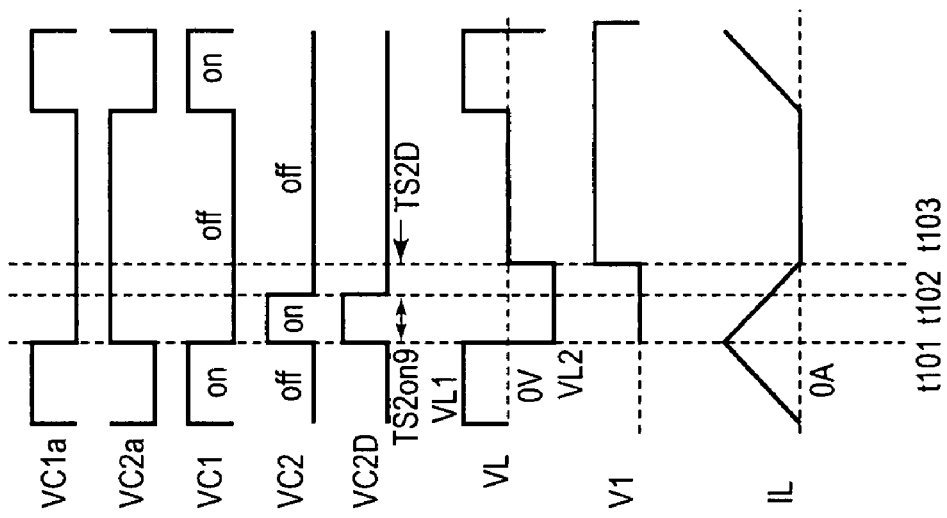
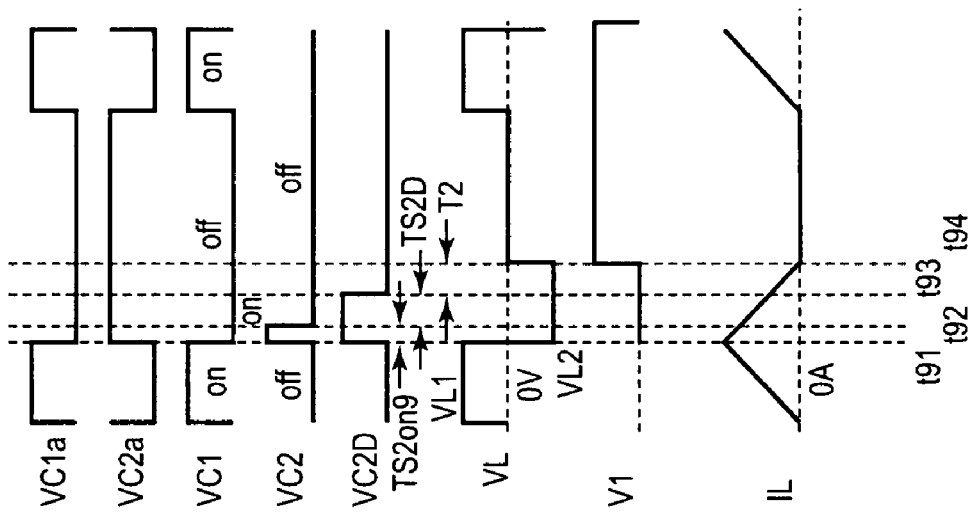
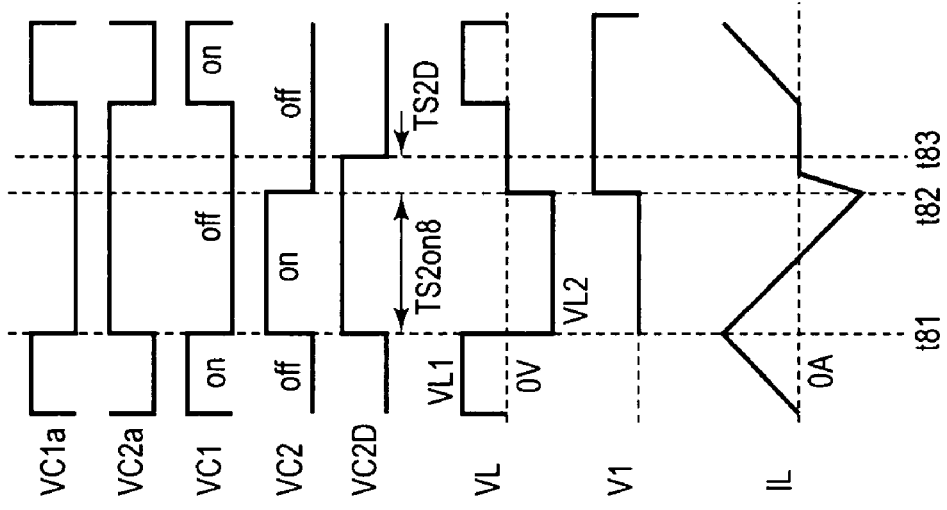

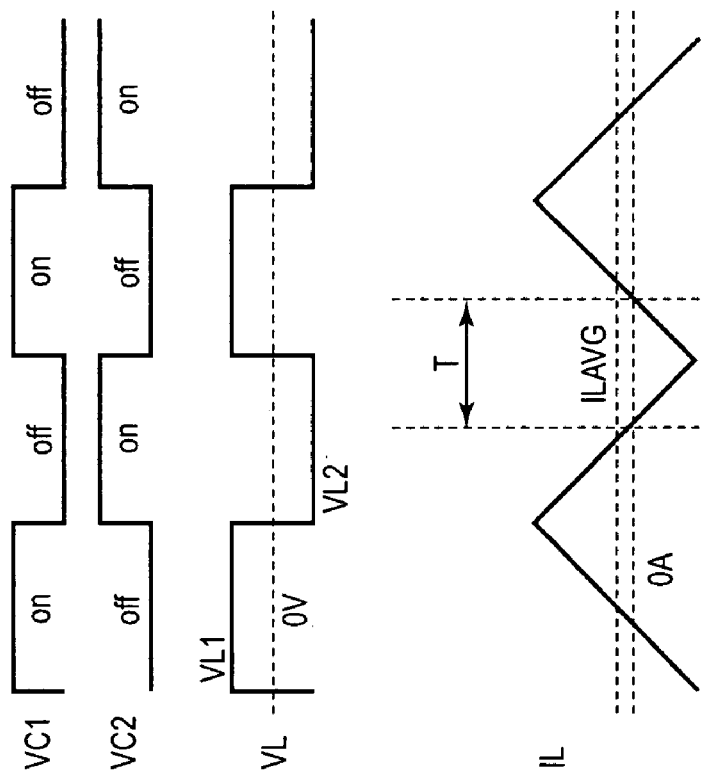
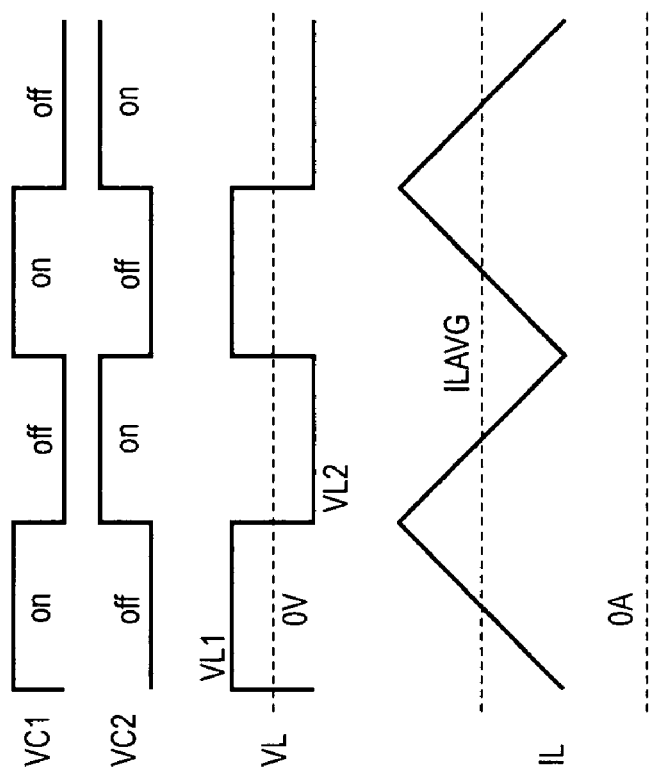
FIG. 24A
FIG. 24B

CONTROL CIRCUIT OF DC-DC CONVERTER WITH SYNCHRONOUS RECTIFIER ADJUSTING SIGNAL TO IMPROVE EFFICIENCY AT LIGHT LOADS AND CONTROL METHOD THEREOF

BACKGROUND OF THE INVENTION

1. Field of the Invention

The present invention relates to a DC-DC converter, the control circuit thereof and, the control method thereof. More particularly, the present invention relates to a DC-DC converter of a synchronous rectifier type, wherein the efficiency thereof under a light load condition is improved, the control circuit thereof, and the control method thereof.

2. Related Art

FIG. 19 is a block diagram showing the configuration of a general DC-DC converter. The DC-DC converter of FIG. 19 includes a conversion block 2 and a control block 3. The conversion block 2 converts an input voltage VIN to an output voltage VOUT of a specific magnitude. In addition, the control block 3 outputs a signal VCONT controlling the output of the conversion block 2 using the output VOUT of the conversion block 2 as a feedback signal, and includes a detecting circuit 4, an error amplifier circuit 5, a reference voltage source 6, a comparison circuit 7 and an oscillation circuit 8.

The detecting circuit 4 detects the output voltage of the conversion block 2. The error amplifier circuit 5 compares a detection consequence VO of the detecting circuit 4 with a predetermined reference voltage VREF fed from the reference voltage source 6, amplifies the difference between VO and VREF and outputs the amplified voltage difference as a voltage value VE. The reference voltage source 6 supplies the reference voltage VREF to the error amplifier circuit 5. The control block 3 controls the conversion block 2 so that detected the voltage value VO of the output voltage VOUT becomes equal to the reference voltage VREF. The comparison circuit 7 compares an output voltage VE from the error amplifier circuit 5 with an output signal VOSC of the oscillation circuit 8, generates a control signal VCONT based on the result of comparison, and outputs the control signal VCONT to the conversion block 2. The oscillation circuit 8 supplies a signal VOSC (a triangular wave or a saw tooth wave) of a specific frequency to the comparison circuit 7.

FIG. 20 through 23 show general examples of the conversion block 2. FIG. 20 shows an example where a DC-DC converter 1 is a buck converter. The buck converter decreases the output voltage VOUT with respect to the input voltage VIN, and obtains the output voltage VOUT lower than the input voltage VIN.

In the circuit example of FIG. 20, an inductor 14a (L) is connected in series to the input, and a capacitor 15a (C) is connected in the next stage in parallel (to the inductor 14b (L).) In addition, a switch 12a (S1) is connected between the input and the inductor 14a (L). A synchronous rectifier switch 13a (S2) is connected to the connecting point of the main switch 12a (S1) and the inductor 14a (L), and between the connection point and the ground GND. And a drive circuit 11a is connected to drive the switches 12a (S1) and 13a (S2).

When the drive circuit 11a turns the switch 12a (S1) on and turns the switch 13a (S2) off based on the control signal VCONT from the control block 3, a current IL flowing through the inductor 14a (L) increases (namely energy is stored in the inductor 14a (L)). When the switch 12a (S1) is turned off and the switch 13a (S2) is turned on, the current IL decreases (namely energy of the inductor 14a (L) is released).

The magnitude of the output voltage VOUT can be controlled by controlling the switching of the switches 12a (S1) and 13a (S2).

FIG. 21 shows an example where the DC-DC converter 1 is a boost converter. The output voltage OUT is increased with respect to the input voltage VIN in the configuration of FIG. 21, and the output voltage VOUT higher than the input voltage VIN is obtained.

In the circuit example of FIG. 21, the inductor 14b (L) is connected in series to the input, and a capacitor 15b (C) is connected in the back stage in parallel (to the inductor 14b (L)). In addition, the main switch 12b (S1) is connected between the right side of the inductor 14b (L) and the ground GND. The synchronous rectifier switch 13b (S2) is connected between the inductor 14b (L) and the capacitor 15b (C). A drive circuit 11b is connected to drive the main switch 12b (S1) and the synchronous rectifier switch 13b (S2).

FIG. 22 shows an example where the DC-DC converter 1 is a buck-boost converter. In the configuration of FIG. 22, the output voltage VOUT for the input voltage VIN is increased or decreased, and the output voltage VOUT higher or lower than the input voltage VIN is obtained.

In the circuit example of FIG. 22, an inductor 14c (L) is connected in parallel with the input and the switch 12c (S1). A capacitor 15c (C) is connected in the back stage in parallel to the input. In addition, the main switch 12c (S1) is connected between the input and the inductor 14c (L), and a synchronous rectifier switch 13c (S2) is connected between the inductor 14c (L) and the capacitor 15c (C), and a drive circuit 11c is connected to drive the main switch 12c (S1) and the synchronous rectifier switch 13c (S2).

FIG. 23 shows an example where the DC-DC converter 1 is a flyback converter. A transformer 16 is used in FIG. 23, and the output voltage VOUT is increased or decreased with respect to the input voltage VIN.

In the circuit example of FIG. 23, the transformer 16 is installed such that the input is on the primary side of the transformer 16, and a capacitor 15d (C) is installed on the secondary side of the transformer 16. And the main switch 12d (S1) is connected to the primary coil of the transformer 16. The synchronous rectifier switch 13d (S2) is connected between the secondary coil of the transformer 16 and a capacitor 15d (C). A drive circuit 11d is connected to drive the main switch 12d (S1) and the synchronous rectifier switch 13d (S2).

The operation of the DC-DC converter 1 having any of the configurations shown in FIG. 20 through 23 will be briefly described with reference to FIG. 24 below. Driving signals VC1 and VC2 for driving the switches S1 and S2 are fed from the drive circuit 11 (11a, 11b, 11c, or 11d) in any of FIG. 20 through 23, and the switches S1 and S2 are turned on and off alternately.

The main switch S1 and the synchronous rectifier switch S2 of FIG. 20 through 23 are semiconductor switching elements such as a MOSFET and a bipolar transistor, or mechanical switching elements such as a relay circuit.

In the drawings, the switch S1 (S2) is ON when the driving signal VC1 (VC2) is HIGH, and the switch S1 (S2) is OFF when the driving signal VC1 (VC2) is LOW, as described below. However, the switch S1 (S2) may be set, with no problem, to be OFF when the driving signal VC1 (VC2) is HIGH and the switch S1 (S2) to be ON when the driving signal VC1 (VC2) is LOW depending on the characteristics of the element used for the switch S1 (S2).

When the driving signals VC1 and VC2 are input as shown in FIG. 24 and the main switch S1 and the synchronous rectifier switch S2 repeat ON and OFF states alternately, the voltage VL across the inductor L (or the coil which constitutes the transformer) theoretically exhibits the waveforms as shown in FIGS. 24(a) and 24(b).

In FIGS. 24(a) and 24(b), the voltage VL across the inductor L has a square waveform synchronized with the drive voltages VC1 and VC2. The positive and negative voltages of the voltage VL are respectively represented by VL1 and VL2, respectively. When the DC-DC converter 1 is the buck converter of FIG. 20, VL1=VIN−VOUT and VL2=−VOUT, respectively. When the DC-DC converter 1 is the boost converter of FIG. 21, VL1=VIN and VL2=VIN−VOUT, respectively. And, when the DC-DC converter 1 is the buck-boost converter of FIG. 22 or the flyback converter of FIG. 23, VL1=VIN (the primary side) and VL2=VOUT (the secondary side) respectively. Here, VIN and VOUT are the input voltage and the output voltage of the DC-DC converter 1 respectively.

The inductor current IL increases monotonically when the switch S1 is turned on and the switch S2 is turned off. The inductor current IL decreases monotonically when the switch S1 is turned off and the switch S2 is turned on. An average value ILAVG of the inductor current IL is equal to IOUT for the buck converter of FIG. 20. The average value ILAVG of the inductor current IL is equal to IINAVG for the boost converter of FIG. 21. And, in the case of the buck-boost converter of FIG. 22 or the flyback converter of FIG. 23, the average value ILAVG is equal to IINAVG+IOUT. In this regard, IIN, IINAVG and IOUT are respectively the input current, the average value of the input current IIN, and the output current of DC-DC converter 1.

A converter of a synchronizing rectification type has two operating states depending on whether the inductor current IL is negative for a certain period or not. FIG. 24(a) shows operational waveforms when the inductor current IL is always positive and FIG. 24(b) shows operational waveforms when the inductor current IL is negative for a certain period.

In FIG. 24(b), the inductor current IL has a negative polarity during a period T. During the period when the inductor current IL is negative, generally the output current IOUT is small. In this case, because the ratio of losses caused by the devices constituting the DC-DC converter 1 to the output power becomes large, the efficiency is impaired.

To obviate the problems described above, during the period when the inductor current IL is negative, a method for reducing the losses of the switch and the inductor is employed. The losses of the switch and inductor caused by the negative current during the period T of FIG. 24(b) are reduced by interrupting the negative current of the inductor current IL as shown in FIG. 25.

In FIG. 25, the inductor current does not exhibit negative polarity by appropriately setting a period for which VC1 and VC2 are OFF simultaneously. FIG. 26 is a block diagram showing a general configuration of a DC-DC converter, provided with a negative current interruption circuit for interrupting the negative current of the inductor.

In the DC-DC converter of FIG. 26, a negative current detecting circuit 21 is disposed as the negative current interruption circuit. The negative current detecting circuit 21 detects IL of 0 A or lower and outputs a signal to the driver circuit to turn off the switch S2.

FIG. 27 shows an example of the negative current detecting circuit 21 in FIG. 26. The circuit shown in FIG. 27 includes a comparator 22 that compares signal IL indicating the magnitude of the inductor current IL with the reference signal IREF. The comparator sets signal VCOMP at HIGH and output the signal VCOMP set at HIGH to the driver circuit. The drive circuit turns off the switch S2 based on the signal VCOMP set at HIGH.

In FIG. 27, the signal IL is fed into the inverting input of the comparator 22 and the signal IREF is fed into the non-inverting input. Alternatively, the input scheme may be reversed with no problem. In this case, when the signal IL became equal to or less than the signal IREF, a LOW signal is fed as the signal VCOMP and the drive circuit turns the switch S2 off based on the signal VCOMP set at LOW.

In the circuit of FIG. 27, the inductor current IL and 0 A are compared by setting IREF at 0 A. When the signal IL is equal to or less than 0 A, the signal VCOMP is set at HIGH and the switch S2 is turned off.

However, the method described above causes a time delay between the time point at which the inductor current IL becomes 0 A and the time point, at which the switch S2 is turned off, due to the delays caused between the response of the negative current detecting circuit 21 or the drive circuit 11 and the switch S2. Therefore, the inductor current IL at the time point at which the switch S2 is really turned off is very much lower than 0 A.

FIG. 28 shows the state described above. In FIG. 28, the time delay caused between the negative current detecting circuit 21, or the drive circuit 11, and the switch S2 is represented by td. The inductor current IL falls down to −ILov, since the switch S2 is turned off after the time delay td has passed from the time when the inductor current IL becomes 0 A.

It is necessary to shorten the time delay td to reduce the negative current. For shortening the time delay, it is necessary to make the negative current detecting circuit 21 and the drive circuit 11 operate at a high speed. However, when these circuit operations are speeded up, the currents consumed in the negative current detecting circuit 21 and the drive circuit 11 increase. In particular, it may be requested to shorten the time delay td to several nanoseconds in a small DC-DC converter operating in a MHz frequency range. For realizing the time delay of several nanoseconds, the power consumptions of the negative current detecting circuit 21 and the drive circuit 11 soar from several milliwatts to several tens of milliwatts. Thus, the power consumptions of the circuits 11 and 21 become higher than the output power of the DC-DC converter in the operating state in which a period exists for which the inductor current IL has negative polarity. Therefore, the effects of interrupting the negative inductor current IL are canceled.

In addition, it is conceivable to estimate the negative magnitude of the inductor current IL during the time delay td in advance and to set IREF of FIG. 27 such that IREF>0 A, so that IL may be equal to 0 A at the time point at which the switch S2 is turned off. However, the gradient at which the inductor current IL decreases varies depending on the operating state of the DC-DC converter, such as the input voltage and the output voltage. Therefore, if IREF is set appropriately for a gentle gradient of the inductor current IL, a negative current will flow when the inductor current IL varies at a steep gradient. If IREF is set appropriately for the steep gradient of the inductor current IL, the switch S2 will be turned off before IL reaches 0 A when the inductor current IL varies at a gentle gradient, and the period from the time point at which the switch S2 is turned off to the time point at which IL reaches 0 A will increase. Therefore, the period for which a current flows to a parasitic diode of the switch S2, that is the period from the time point at which the switch turning-off of S2 is turned off to the time point, at which IL is 0 A, is elongated, and efficiency is impaired.

As described above, in the case in which the negative current detecting circuit is configured as shown in FIG. 27, the value of the inductor current IL varies when the switch S2 is turned off depending on the operating state of the DC-DC converter, and, therefore, the accuracy of negative current interruption is impaired.

Japanese Patent No. 3501491 discloses a method of improving the efficiency when a light load is placed on the output of the DC-DC converter. The configuration of Japanese Patent No. 3501491 conducts intermittent switching which stops the switching operation of a switching element for a certain period under light load. However, this method causes many ripples in the output voltage. In addition, the negative current of the inductor cannot be intercepted accurately. Further, Japanese Patent No. 3501491 discloses a method for intercepting the negative current of the inductor. However, this method employs a configuration similar to that shown in FIG. 27, and therefore the same problems as described above are caused.

SUMMARY OF THE INVENTION

The invention provides a DC-DC converter of a synchronous rectifier type, the control circuit thereof and the control method thereof which facilitates performing detection and interruption of the negative current of an inductor with low power consumption, high accuracy and a simple circuit configuration, to improve the efficiency under a light load at interrupting the negative current of the inductor and solving the above-described problem.

According to a first aspect of the invention, there is provided a control circuit which controls a DC-DC converter of a synchronous rectifier type including an inductor or a transformer, the control circuit including an S2 ON-period decision part, an S2 ON-period adjustment part, and an S2 delay part.

The S2 ON-period decision part determines whether the ON-period of the synchronous rectifier switch is too long or too short. The S2 ON-period adjustment part generates an adjusting signal that adjusts the ON-period, during which the synchronous rectifier switch is ON, based on the decision consequence of the S2 ON-period decision part.

The S2 delay part adjusts the delay quantity, from the time when a signal that changes over the ON and OFF states of the synchronous rectifier switch changes to ON to the time when the synchronous rectifier switch is forcibly turned off based on the adjusting signal.

Advantageously, the S2 ON-period decision part determines that the ON-period of the synchronous rectifier switch is too long in the case in which the inductor current flowing through the inductor or the transformer is negative when the synchronous rectifier switch turns off. Advantageously, the S2 ON-period decision part determines that the ON-period of the synchronous rectifier switch is too short in the case in which the inductor current flowing through the inductor or the transformer is positive when the synchronous rectifier switch turns off.

By employing the configuration described above, the period for which the synchronous rectifier switch is ON is adjusted by the polarity of the inductor current when the synchronous rectifier switch is turned off. Advantageously, the S2 ON-period decision part includes a comparator which compares the inductor current flowing through the inductor or the transformer with a reference value, and a first logic part which generates a signal (VCa1, VCa2) indicating that the ON-period of the synchronous rectifier switch is too long or too short based on an output from the comparator and the signal that changes over the ON and OFF of the synchronous rectifier switch.

Advantageously, the S2 ON-period adjustment part includes a first current source, a first switch that changes over the ON and OFF states of the first current source based on the output from the S2 ON-period decision part, a second current source connected in series between the first current source and the ground, a second switch which changes over the ON and OFF states of the second current source based on the output from the S2 ON-period decision part, a first capacitor connected between the ground and a connecting point of the first switch and the second switch, and a first output portion which outputs a voltage across the first capacitor.

Advantageously, the S2 delay part includes a third current source that outputs an output value varied based on the adjusting signal, a third switch which changes over the ON and OFF of the third current source based on a first changeover signal, a second capacitor connected between the third switch and the ground, a fourth switch which grounds a connecting point of the third switch and the second capacitor to the ground based on a second changeover signal, a fourth logic part which generates the first changeover signal which changes over the ON and OFF of the third switch and the second switch signal which changes over the ON and OFF of the fourth switch using the input signal of the drive circuit of the synchronous rectifier switch as the input thereof, and a fifth logic part which generates an output signal which forcibly turns off the synchronous rectifier switch based on the voltage across the second capacitor.

In addition, the scope of the invention includes a DC-DC converter employing the above described control circuit therein. The DC-DC converter according to the invention can be applied to the DC-DC converter of a buck converter, a boost converter, a buck-boost converter and a flyback converter.

The DC-DC converter according to the invention, especially the DC-DC converter of a synchronous rectifier type, facilitates detecting and interrupting the negative current of an inductor with low power consumption, high accuracy and a simple circuit configuration especially when the negative current of the inductor is interrupted to improve the efficiency under a light load.

BRIEF DESCRIPTION OF THE DRAWINGS

The invention will be described with reference to a certain preferred embodiment and the accompanying drawings, where:

FIG. 6(a) is a wave chart describing the operational waveforms of a timer circuit when the ON-period of the switch S2 is too long, and FIG. 6(b) is a wave chart describing the operational waveforms of the timer circuit when the ON-period of the switch S2 is too short.

FIG. 9(a) through 9(e) are block diagrams showing examples of a voltage controlled current source in the case in which the value of the transconductance of the voltage controlled current source is negative.

FIG. 12(a) through 12(c) are wave charts describing the operational waveforms of the DC-DC converter in the case of using the S2 ON-period decision circuit of FIG. 11.

FIGS. 24(a) and 24(b) are wave charts describing the operational waveforms of the general DC-DC converter.

DETAILED DESCRIPTION OF THE PREFERRED EMBODIMENT

Figure 1:
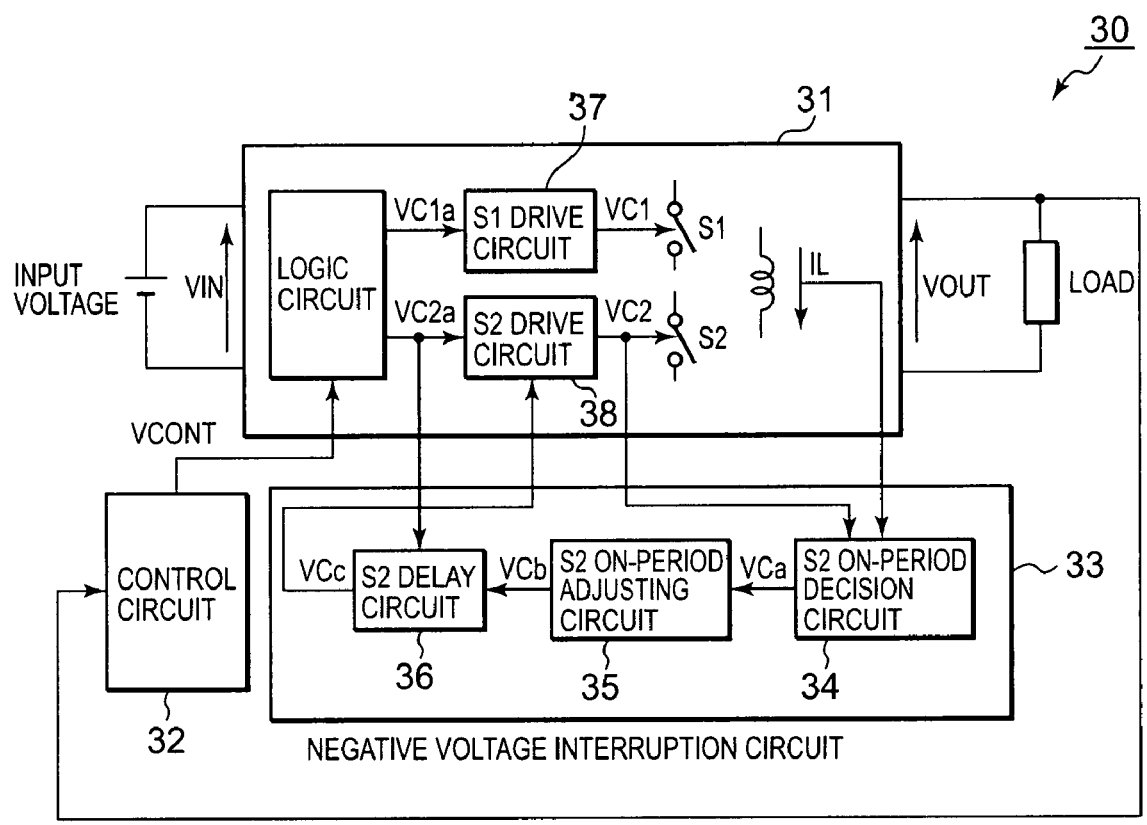
FIG. 1 is a block diagram showing the skeleton framework of a DC-DC converter according to an preferred embodiment of the invention.

The preferred embodiments of a DC-DC converter, the control circuit thereof and the control method thereof according to the invention will now be explained in detail with reference to the attached drawings. FIG. 1 is a block diagram showing the skeleton framework of a DC-DC converter according to an preferred embodiment of the invention. A DC-DC converter 30 according to the preferred embodiment includes a conversion block 31, a control circuit 32 and a negative current interruption circuit 33 in FIG. 1.

Figure 26:
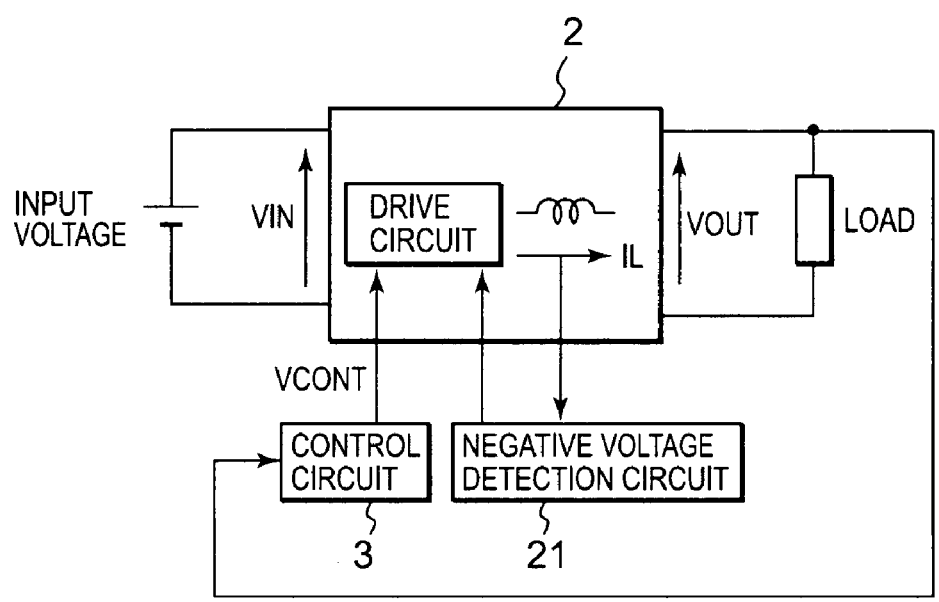
FIG. 26 is a block diagram showing a general configuration of the DC-DC converter provided with a negative current interruption circuit of the inductor.
Figure 27:
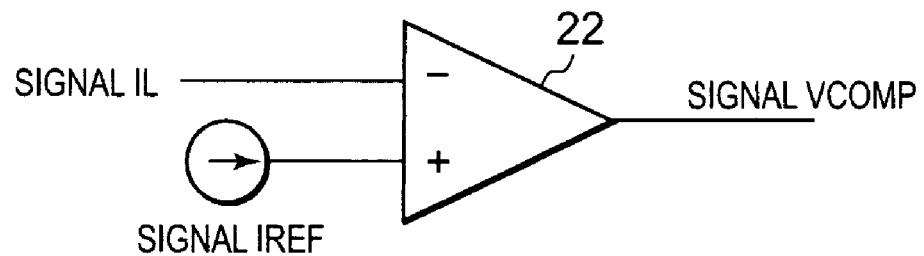
FIG. 27 is a block diagram showing an example of a negative current detecting circuit.
Figure 28:
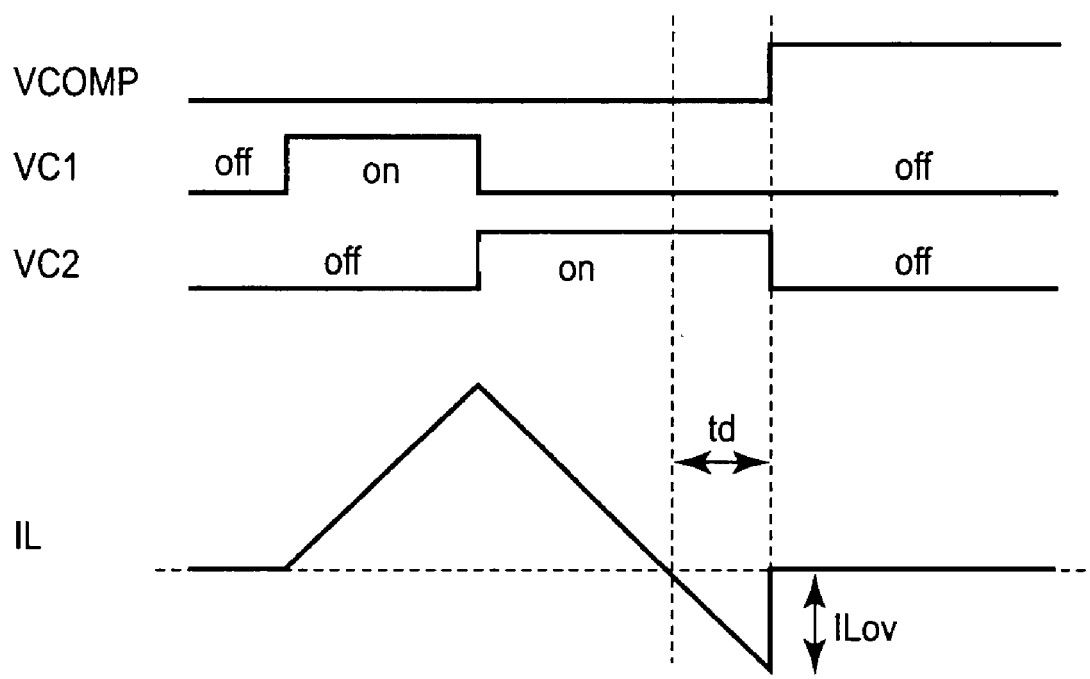
FIG. 28 is a wave chart describing the operational waveforms of the DC-DC converter in which the negative current interruption circuit of the inductor is provided.

The conversion block 31 and the control circuit 32 are basically the same as the conversion block 2 and the control circuit 3 of FIG. 26 respectively. In FIG. 1, the negative current interruption circuit 33 is independent of the control circuit 32 mainly for the sake of clean description, but may, of course, be combined together. Alternatively the negative current interruption circuit 33 may be constituted as a part of the control circuit 32.

The negative current interruption circuit 33 of FIG. 1 is configured by an S2 ON-period decision circuit 34, an S2 ON-period adjusting circuit 35 and an S2 delay circuit 36. A signal indicating the polarity of an inductor current IL and a signal VC2 for changing the ON/OFF states of a synchronous rectifier switch S2 are fed to the S2 ON-period decision circuit 34. The polarity inductor current IL is determined when the switch S2 is turned off. The S2 ON-period decision circuit 34 determines that the ON-period of the switch S2 is short when the indicator current IL is of positive polarity, and that the ON-period of the switch S2 is long when the inductor current is of negative polarity. The decision consequence is fed to the S2 ON-period adjusting circuit 35 in the next stage as an output signal VCa (VCa1, VCa2).

The output signal VCa (VCa1, VCa2) switches the switches S3 and S4 in the S2 ON-period adjusting circuit 35 to be described below (cf. FIG. 7). The signal VCa1 changes the ON/OFF state of the switch S3 and the signal VCa2 changes the ON/OFF state of the switch S4. When the switch S3 is ON, the switch S4 is changed to the OFF state, and when the switch S3 is OFF, the switch S4 is changed to the ON state. Only the signal VCa1 (or VCa2) may be fed from the S2 ON-period decision circuit 34 and the switches S3 and S4 may be switched only by the signal VCa1 (or VCa2) in the S2 ON-period adjusting circuit 35 with no problem.

The S2 ON-period adjusting circuit 35 generates a signal VCb for elongating a time delay of the S2 delay circuit 36 in the next stage to elongate the ON-period when the ON-period of the switch S2 is short, and for shortening the time delay of the S2 delay circuit in the next stage to shorten the ON-period when the ON-period of the switch S2 is long. The signal VCb is fed to the S2 delay circuit 36. In other words, the signal VCb functions as an adjusting signal which adjusts the time delay to be most suitable by adjusting (controlling) the time delay of the S2 delay circuit 36.

The VC2a of a S2 drive circuit 38 for driving the ON/OFF of the switch S2 of the conversion block 31 or a signal VC2 for changing the ON/OFF of the switch S2 are fed to the S2 delay circuit 36. The S2 delay circuit 36 outputs a signal VCc, the generation thereof has been delayed for a predetermined period after the generation of a signal for turning the switch S2 on. The delay signal is controlled by the signal VCb and fed into the S2 drive circuit 38. When the delay signal VCc is fed into the S2 drive circuit 38, the S2 drive circuit outputs a signal for turning off the switch S2 and, then, the switch S2 is brought into the off state thereof.

Figure 2A:
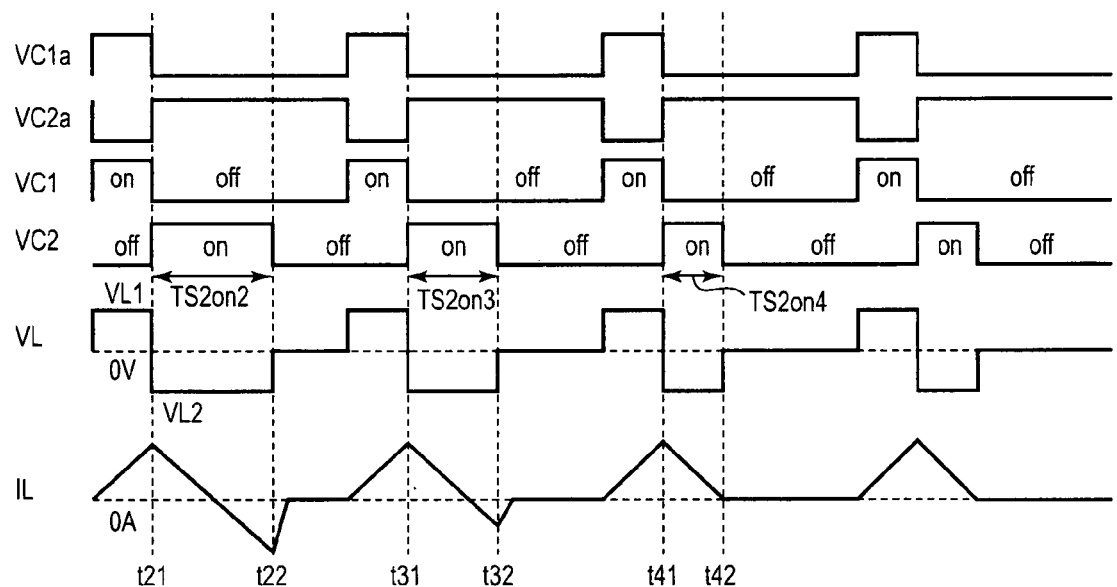
FIG. 2(a) is a wave chart describing the operational waveforms of the DC-DC converter when the ON-period of a switch S2 is too long.
Figure 2B:
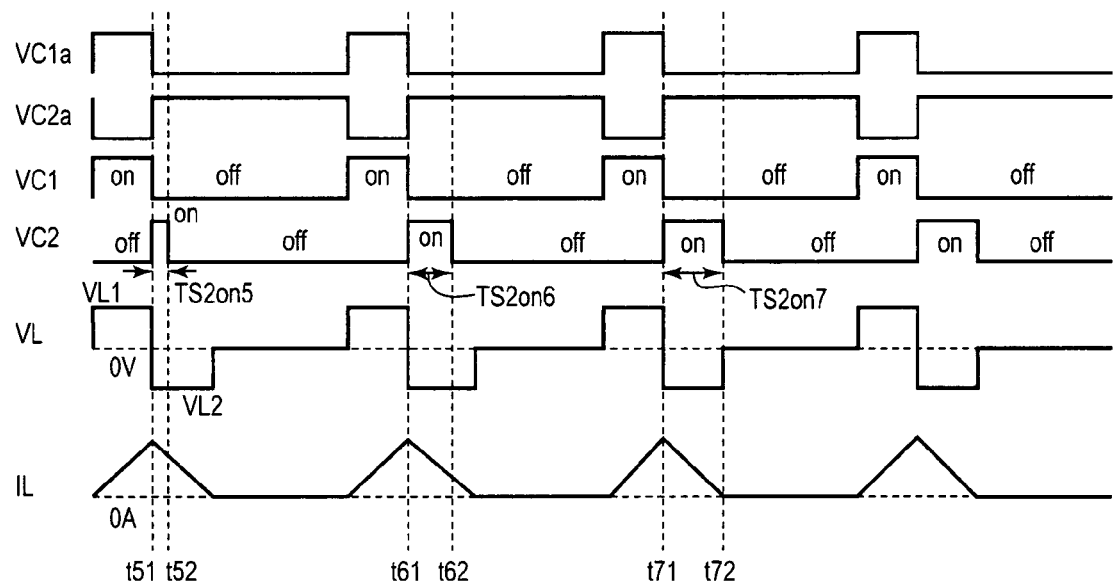
FIG. 2(b) is a wave chart describing the operational waveforms of the DC-DC converter when the ON-period of the switch S2 is too short.

FIGS. 2(a) and 2(b) are wave charts describing the operational waveforms for explaining the operation of the DC-DC converter according to the preferred embodiment. In FIGS. 2(a) and 2(b), the input signals and the output signals of the S1 drive circuit 37 for driving the ON/OFF of the switch S1 and the S2 drive circuit 38 for driving the ON/OFF of the switch S2 of the conversion block 31 are in-phase. Alternatively, it is possible for the input signals and the output signals to be in anti-phase as long as the logic consistency is maintained. In addition, the switch S1 is in the ON state when a signal VC1 is HIGH, and the switch S1 is in the OFF state when the signal VC1 is LOW. When a switch exhibiting reverse characteristics is used for the switches S1 and S2, the signal VC1 can be treated to be in anti-phase to the case of FIG. 2 such that the switch S1 is in the ON state when the signal VC1 is LOW and the switch S1 is in the OFF state when the signal VC1 is HIGH, since the relationship between the input and output signals of the S1 drive circuit changes according to the characteristics of the switching element used. The same explanations can be made on the relationship between the switch S2 and the signal VC2.

FIG. 2(a) shows operation in the case in which the inductor current is of the negative polarity due to the too-long ON-period of the switch S2. In FIG. 2(a), the negative current is caused in the inductor IL, since the ON-period TS2on2 of the switch S2 is too long.

In this case, since the polarity of the inductor current IL at the time t22, at which the signal VC2 changes to LOW and the switch S2 turns off, is negative, the S2 ON-period decision circuit 34 determines that the ON-period of the switch S2 is long and outputs the decision consequence as VCa. The S2 ON-period adjusting circuit 35 outputs a control signal VCb to shorten the time delay of the S2 delay circuit 36 in the next stage based on the decision consequence.

The S2 delay circuit 36 outputs the signal, the polarity of which changes at the timing delayed for a predetermined period from the rise of the signal VC2a or the signal VC2 shown in FIG. 2, as VCc. The time delay is shortened based on the signal VCb and the signal, the time delay of which is equal to TS2on3, is output as VCc of the next period.

As the delay signal VCc, which is not illustrated, is output at a time t32, the S2 drive circuit 38 changes the signal VC2 to LOW, and the switch S2 is turned off forcibly to interrupt the negative current. Since the negative current is generated at the time t32, the operation is repeated such that the time delay is further shortened in the next switching period to reduce the negative current. The negative current is interrupted in the stationary state.

The period for which the inductor current IL is of the negative polarity, becomes shorter in the period between t31 and t41 than in the period between t21 to t31 in FIG. 2(a), and operation is in a stationary state in the period after the time t41, for which and the negative current is interrupted.

FIG. 2(b) shows operation when the ON-period of switch S2 is too short. Since the switch S2 ON-period TS2on5 is too short in FIG. 2(b), the switch S2 is turned off in the stage in which the inductor current IL is a large positive current.

Since the polarity of the inductor current IL is positive at the time t52, at which the signal VC2 changes to LOW and the switch S2 is turned off, the S2 ON-period decision circuit 34 determines that the ON-period of the switch S2 is short and outputs the decision consequence as VCa. The S2 ON-period adjusting circuit 35 outputs the control signal VCb for elongating the time delay of the S2 delay circuit 36 in the next stage depending on the decision consequence.

The S2 delay circuit 36 outputs the signal, the polarity thereof changes at the timing delayed for a predetermined period from the rise of the signal VC2a or the signal VC2 shown in FIG. 2, as VCc. The time delay is elongated based on the signal VCb and the signal, the elongated time delay thereof is equal to TS2on6 is output as VCc of the next period.

As the delay signal VCc (not illustrated) is output at the time t62, the S2 drive circuit 38 changes the signal VC2 to LOW and the switch S2 is turned off. As the polarity of the inductor current IL is positive at the time t62, the operation is repeated such that the inductor current IL, at the time when the switch S2 is turned off, approaches 0 A and the time when the switch S2 is turned off is controlled to be the most suitable (i.e. the inductor current IL is 0 A or almost 0 A) in the stationary state.

In FIG. 2(b), the inductor current IL more nearly approaches 0 A in the period between t61 and t71 than in the period between t51 and t61, and the S2 ON-period is adjusted so that operation may be brought into the stationary state in the period after the time t71 and so that the inductor current IL may be almost 0 A.

In this manner, highly precise current interruption characteristics can be obtained, as the DC-DC converter 30 according to the preferred embodiment facilitates avoiding the adverse effects of the operating delay of the circuit in the stationary state by the feedback operation shown in FIGS. 2(a) and 2(b). Therefore, it is not necessary to speed up the operation of the negative current interruption circuit 33 excessively and the negative current interruption circuit 33, the current consumption of which is low, can be configured.

Figure 3:
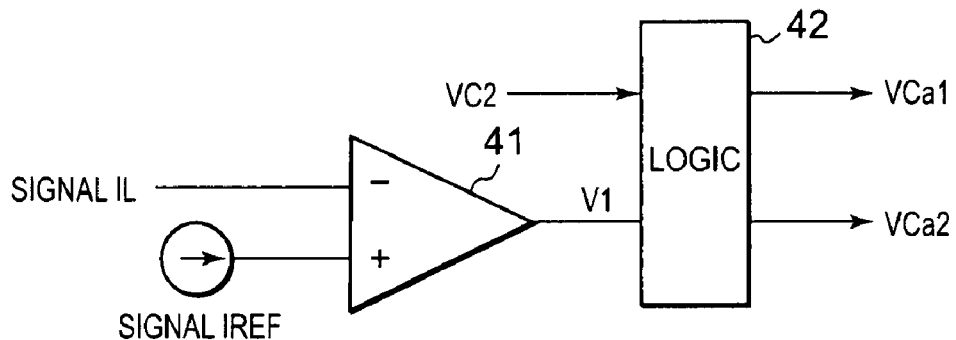
FIG. 3 is a block diagram of a S2 ON-period decision circuit.

The S2 ON-period decision circuit 33 will be explained in detail below. FIG. 3 is a block diagram of the S2 ON-period decision circuit 33. In FIG. 3, a signal IL corresponding to the inductance current IL is compared with a signal IREF corresponding to a reference current IREF by a comparator 41 and a comparison result V1 is fed to a logic part 42. Because the signal VC2 is also fed to the logic part 42, it can be found when the signal VC2 changes to LOW and the switch S2 is turned off. For the signal corresponding to the inductor current IL, the current signal of the inductor current IL or the other signal that facilitates detecting the variation of the inductor current IL may be used with no problem.

Figure 4A:
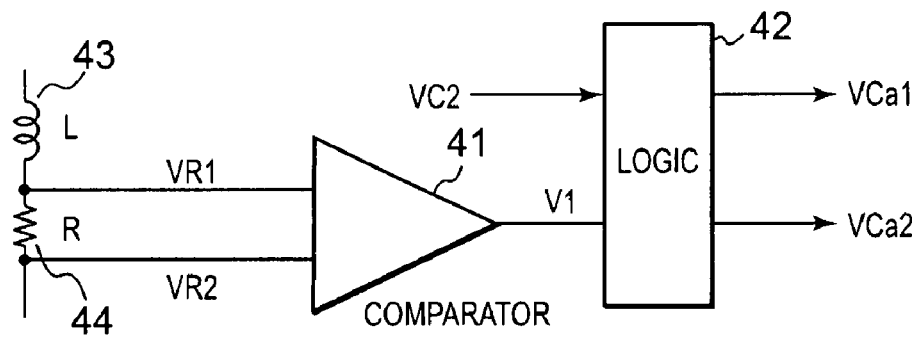
FIGS. 4(a) and 4(b) are block diagrams showing examples relating to the case of using a signal other than a signal IL as an input of a comparator.
Figure 4B:
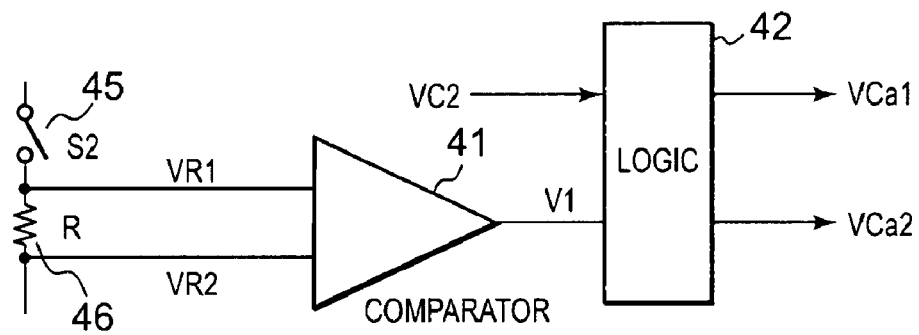

Examples in which the other signal is used for the input of the comparator 41, are shown in FIGS. 4(a) and 4(b) respectively. FIG. 4(a) is a block diagram of the circuit configuration that uses the voltage across a resistor 44 (R), connected in series to an inductor 43 (L) in the conversion block 31 of the DC-DC converter 30 (a secondary coil 14d-2 of a transformer 16 when the DC-DC converter 31 is a flyback converter), for the input of the comparator 41.

Figure 20:
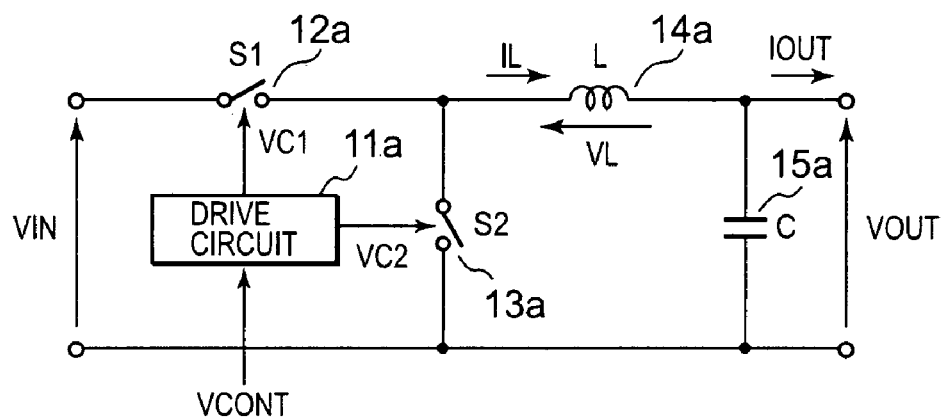
FIG. 20 is a block diagram showing an example where the DC-DC converter is a buck converter.
Figure 21:
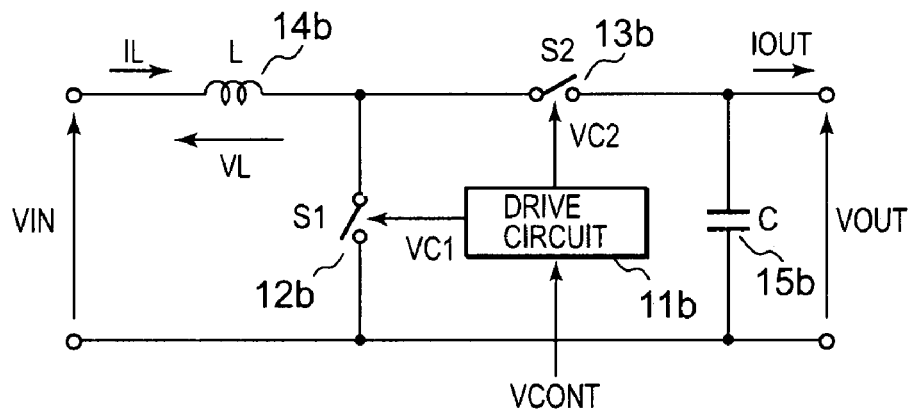
FIG. 21 is a block diagram showing an example where the DC-DC converter is a boost converter.
Figure 22:
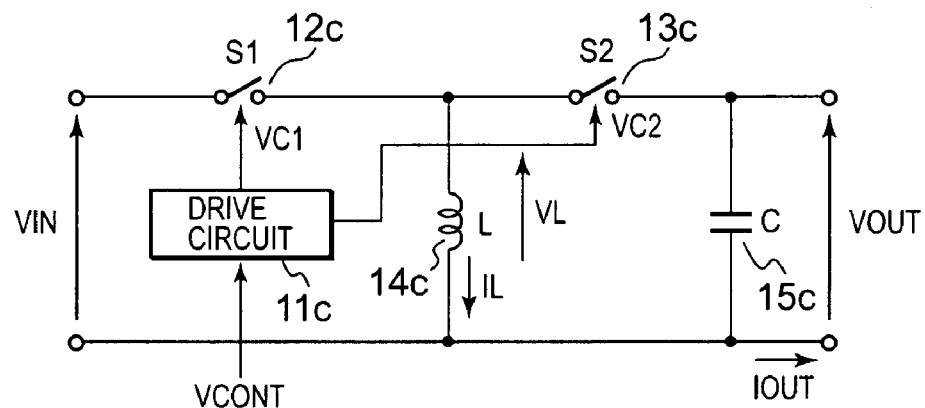
FIG. 22 is a block diagram showing an example where the DC-DC converter is a buck-boost converter.

In the configuration of FIG. 4(a), the voltage across the resistor 44 (R) is compared by the comparator 41 to determine whether the polarity of the voltage across the resistor 44 (R) is reversed or not reversed. When it is desired to fix the potential of any of two inputs of the comparator 41, the resistor 44 (R) is inserted on the right side of the inductor 14a (L) in FIG. 20 in the buck converter. The resistor 44 (R) is inserted on the left side of the inductor 14b (L) in FIG. 21 in the boost converter. The resistor 44 (R) is inserted on the lower side of the inductor 14c (L) in FIG. 22 in the buck-boost converter. The resistor 44 (R) is inserted on the lower side of the secondary coil 14d-2 in FIG. 23 in the flyback converter.

By employing the circuit configurations described above, a potential VR2 in FIG. 4(a) is fixed at VOUT in the buck converter, at VIN in the boost converter, at the ground potential in the buck-boost converter, and at the ground potential in the flyback converter.

FIG. 4(b) is a block diagram showing a circuit configuration that uses the voltage across a resistor 46 (R), connected in series to a switch 45 (S2) as an input signal of the comparator 41. In the configuration shown in FIG. 4(b), the voltage across the resistor 46 (R) is compared by the comparator 41 to determine whether the polarity of the voltage across the resistor 46 (R) is reserved or not.

In the circuit configuration shown in FIG. 4(b), the on-resistance of the switch 45 (S2) may be used for the resistor 46 (R) instead of connecting the resistor 46 (R) to the switch 45 (S2). In this case, the input terminals of the comparator 41 are connected to both terminals of the switch 45 (S2).

The potential across the switch S1 can be used for the potential across the switch S2. One terminal of the switch S1 is connected to the switch S2 and the other terminal of the switch S1 is connected to VIN or to a fixing potential such as the ground potential. Therefore, the use of the voltage across the switch S1 for the input of the comparator 41 can be deemed to be equivalent to the use of the voltage across the switch S2 for the input of the comparator 41.

Other signals that facilitate determining the polarity of the inductor current IL may be used for the signal fed to the comparator 41 in the same manner as the above-described input signal. The logic part 42 will be explained below.

The logic part 42 outputs to the S2 ON-period adjusting circuit 35, the signals VCa1 and VCa2 set at HIGH or LOW in response to an output V1 from the comparator 41 at the time when the signal VC2 is brought into the state for changing the switch S2 to OFF.

The HIGH and LOW states of the signals VCa1 and VCa2 may be reversed as far as the logic consistency with the S2 ON-period adjusting circuit 35 in the next stage is maintained. The period for which the signals VCa1 and VCa2 are fed, may be fixed at a constant time by the configuration that incorporates a clock in the logic part 42, inputs a clock signal from the outside or includes a one-shot circuit in the inside. In this case, when the ON-period of the switch S2 is too long or too short, the shortened or elongated time in the switch S2 ON-period in the next period becomes constant.

The logic part 42 may be provided with a timer function. When the ON-period of the switch S2 is too long, the period, from the time when the polarity of the inductor current IL is inverted to the time when the switch S2 is turned off, is detected by the timer function to obtain a time signal (T1). Then, the signals generated respectively by superposing the time signal (T1) on the signal VCa1 and the signal VCa2 logically may be used for a new VCa1 and a new VCa2. When the ON-period of switch S2 is too short, the period from the time when the switch S2 is turned off, to the time when the inductor current IL becomes zero, is detected by the timer function, to obtain a time signal (T2). The signals generated respectively by superposing the time signal (T2) on the signal VCa1 and the signal VCa2 logically may be used for a new VCa1 and a new VCa2.

By superposing the time signal, the time for which the ON-period of the switch S2 is shortened or elongated in the next-period is made to be long when the detected time is long. The time for which the ON-period of the switch S2 is shortened or lengthened in the next period is made to be short when the detected time is short. Thus, the time adjusted based on the detected time can be varied. Therefore, the adjusted period of time is constant in the case of using a one-shot circuit, which does not use any time signal. As the adjusted time period in the ON-period of the switch S2 can be varied, the settling time can be reduced by employing the circuit configurations described above.

Figure 5A:
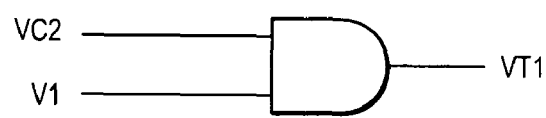
FIG. 5(a) is a block diagram showing an example of a timer circuit when the ON-period of a switch S2 is too long.
Figure 5B:
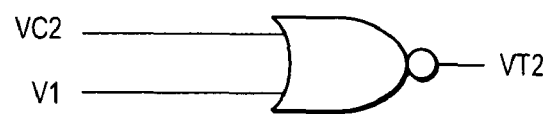
FIG. 5(b) is a block diagram showing an example of the timer circuit when the ON-period of the switch S2 is too short.

FIGS. 5(a) and 5(b) are block diagrams showing circuit configurations exhibiting the timer function that the logic part 42 is provided with. FIG. 5(a) shows the circuit that detects the period from the time when the polarity of the inductor current IL is inverted, to the time when the switch S2 is turned off, when the ON-period of the switch S2 is too long. FIG. 5(b) shows the circuit that detects the period from the time when the switch S2 is turned off, to the time when the inductor current IL becomes zero, when the ON-period of the switch S2 is too short.

The circuit configuration shown in FIG. 5(a) calculates the AND of the ON/OFF switch signal VC2 of the switch S2 and the output signal V1 of the comparator 41. The circuit configuration shown in FIG. 5(b) calculates the NOR of the signal VC2 and the output signal V1.

FIGS. 6(a) and 6(b) are wave charts describing the operational waveforms of the timer circuit of FIGS. 5(a) and 5(b) respectively. FIG. 6(a) describes the operational waveforms of the timer circuit of FIG. 5(a), in which the ON-period of the switch S2 is too long, and FIG. 6(b) shows operational waveforms of the timer circuit of FIG. 5(b) in which the ON-period of the switch S2 is too short.

Here, the output signal V1 of the comparator 41 is set at HIGH when the inductor current IL is 0 A or lower. When the ON-period of the switch S2 is too long, the circuit of FIG. 5(a) outputs VT1 set at HIGH during the period T1 from the time when the inductor current IL becomes 0 A or lower, to the time when the switch S2 is turned off, as shown in FIG. 6(a). When the ON-period of the switch S2 is too short, the circuit of FIG. 5(b) outputs VT2 set at HIGH during the period T2 from the time when the switch S2 is turned off, to the time when the inductor current IL becomes 0 A or lower, as shown in FIG. 6(a). In this way, the time signals T1 and T2 are generated.

The circuits shown in FIGS. 5(a) and 5(b) are configured such that the period output signals VT1, and VT2 for time detection are set at, HIGH. Alternatively, the period output signals VT1 and VT2 for time detection may be set at LOW by keeping consistency with the other logic circuits. In addition, the output signal V1 of the comparator 41 is set at HIGH when the inductor current IL is 0 A or lower. Alternatively, the output signal V1 of the comparator 41 may be set at LOW when the inductor current IL is 0 A or lower.

As described above, the timer circuit mounted on the logic part 42 can be configured by a simple logic as shown in FIGS. 5(a) and 5(b). Alternatively, T1 or T2 may be measured by mounting a counter circuit that counts the clock signal or the other timer function on the logic part 42. In this case, T1 or T2 can be measured directly from the signals VC2 and V1 without using the circuits of FIGS. 5(a) and 5(b).

The S2 ON-period adjusting circuit 35 of FIG. 1 will be explained in detail below. FIG. 7 is a block diagram showing a configuration of the S2 ON-period adjusting circuit 35. The circuit of FIG. 7 is configured by current sources 51 (I1) and 54 (I2), switches 52 (S3) and 53 (S4) for changing the ON/OFF of the current sources 51 (I1) and 54 (I2) respectively, and a capacitor 55 (C1).

Figure 7:
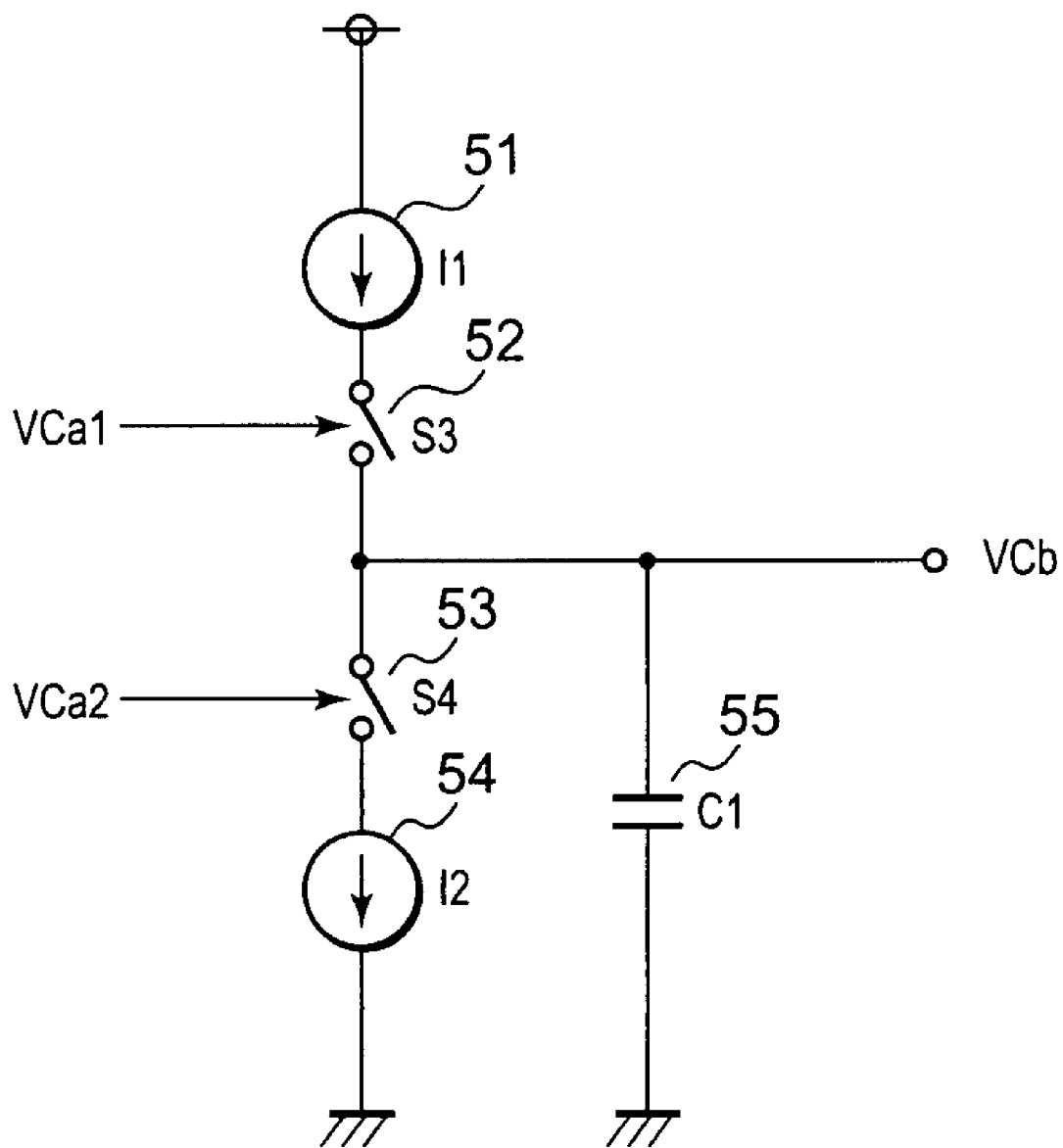
FIG. 7 is a block diagram showing an example of an S2 ON-period adjusting circuit.

The circuit of FIG. 7 has a configuration that connects the switch 52 (S3) and 53 (S4) in series to the current sources 51 (I1) and 54 (I2) respectively, for the sake of convenience. However, since the switch 52 (S3) and 53 (S4) are disposed to operate or to stop current sources 51 (I1) and 54 (I2) respectively, the switches 52 (S3) and 53 (S4) may be incorporated in the current source 51 (I1) and 54 (I2), respectively. In addition, the other configuration may be used in place of the switches 52 (S3) and 53 (S4) of FIG. 7 as far as it is possible for the other configuration to operate or to stop the outputs of the current sources 51 (I1) and 54 (I2).

In FIG. 7, the level of the output signal VCb of the S2 ON-period adjusting circuit 35 varies in response to the HIGH/LOW change of the output signals VCa1 and VCa2 of the S2 ON-period decision circuit 34. Here, the relationship between the HIGH and LOW levels of the output voltage of the signal VCb and the relationship between the long and short ON-periods of switch S2 can be reversed as long as the logic consistency is maintained.

It is assumed now that the ON-period of the switch S2 becomes longer as the output signal VCb becomes higher. When the ON-period of the switch S2 is too short, the signal VCa1 turns the switch 52 (S3) on and the signal VCa2 turns the switch 53 (S4) off. The capacitor 55 (C1) is charged by the current source 51 (I1) while the signals VCa1 and VCa2 are fed. As a result, the voltage value of the output signal VCb increases. On the contrary, when the ON-period of the switch S2 is too long, the signal VCa1 turns the switch 52 (S3) off and the signal VCa2 turns the switch 53 (S4) on. The capacitor 55 (C1) is discharged by the current source 54 (I2) while the signals VCa1 and VCa2 are fed. As a result, the voltage value of the output signal VCd decreases.

Figure 8:
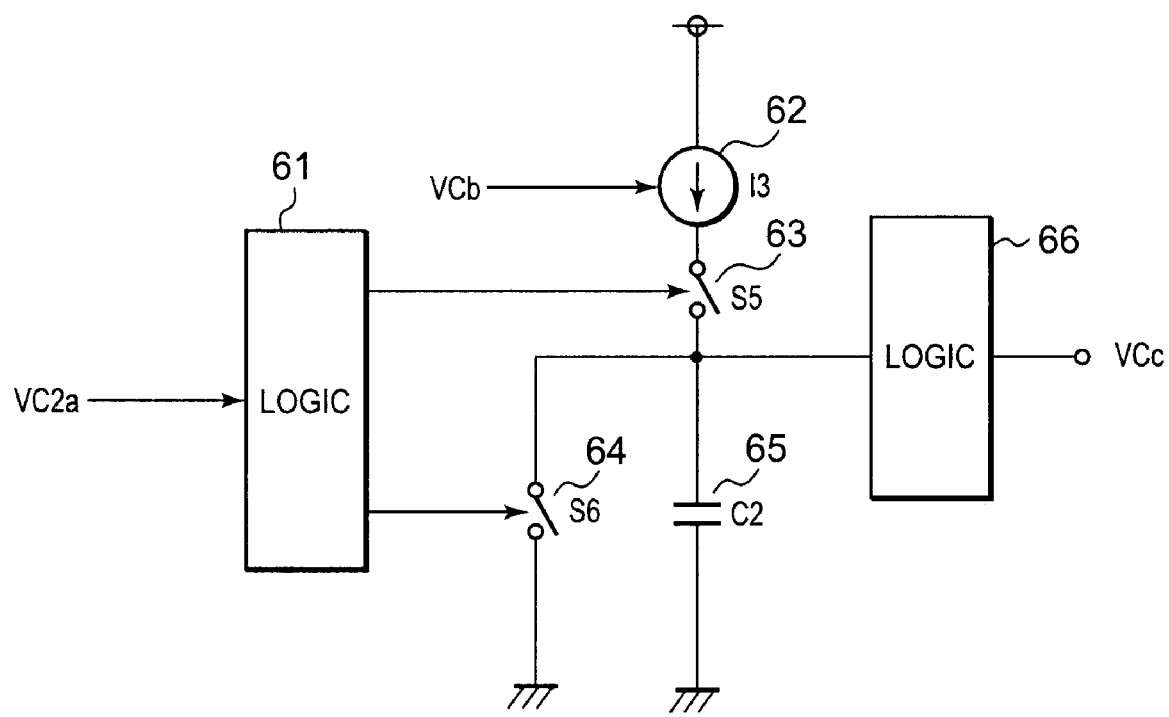
FIG. 8 is a block diagram showing an example of an S2 delay circuit.
Figure 10A:
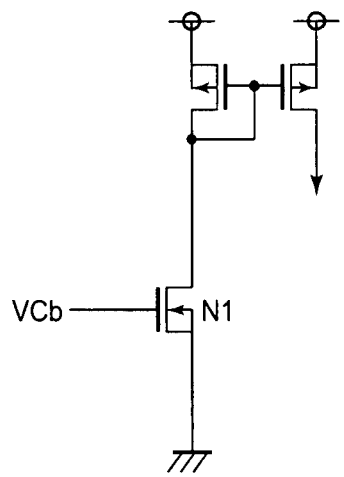
FIG. 10(a) through 10(e) are block diagrams showing an example of the voltage controlled current source in the case, in which the value of the transconductance of the voltage controlled current source, is positive.
Figure 10B:
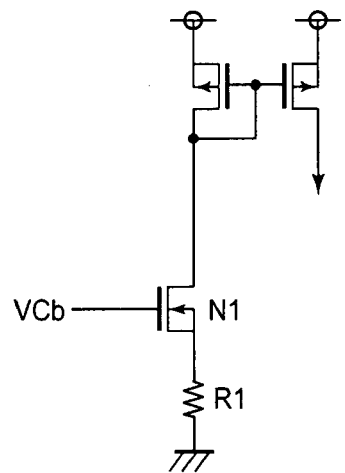
Figure 10C:
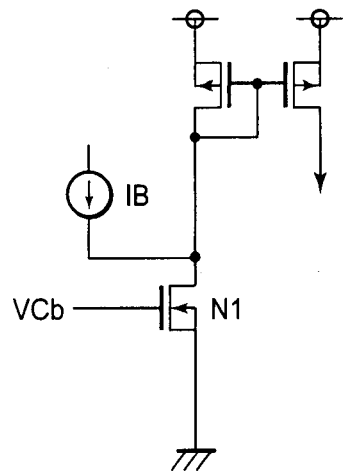
Figure 10D:
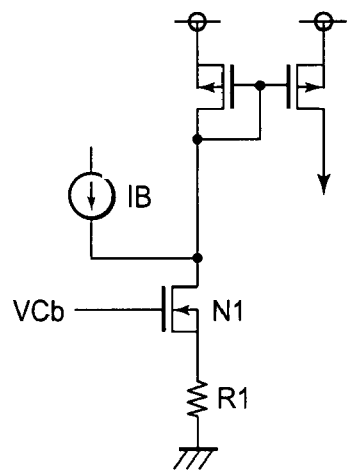
Figure 10E:
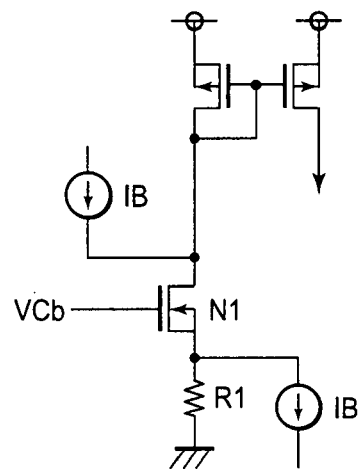

The S2 delay circuit 55 of FIG. 1 will be explained in detail below. FIG. 8 is a block diagram showing a concrete example of the S2 delay circuit 36. The circuit of FIG. 8 is configured by a logic circuit 61 that generates the signals for changing the ON/OFF of switches 63 (S5) and 64 (S6) based on the signal VC2a fed into the S2 drive circuit 38, a voltage controlled current source 62 (I3), the output current thereof is varied by the output signal VCb from the S2 ON-period adjusting circuit 35, a switch 63 (S5) that operates or stops the current source 62 (I3), a capacitor 65 (C2), a switch 64 (S6) that discharges the capacitor 65 (C2), and a logic circuit 66 that generates the output signal VCc to the S2 drive circuit 38.

In the configuration of FIG. 8, the switch 63 (S5) is connected in series to the current source 62 (I3) for the sake of convenience. Since the switch 63 (S5) is disposed to operate or stop the current source 62 (I3), the switches 63 (S5) may be incorporated into the current source 62 (I3). Alternatively, the other configuration that facilitates operating or stopping the output of the current source 62(I3) may be used with no problem.

The signal VC2a or VC2 is fed to the logic 61 and the switch 63 (S5) is turned off and the switch 64 (S6) is turned on during the period, for which the switch S2 is OFF or the switch S1 is ON. The voltage across the capacitor 65 (C2) is lower than the threshold voltage of the input to the logic 66 during this period.

As the signal VC2a or VC2 changes to the signal state that changes the switch S2 to ON, the logic 61 turns the switch 63 (S5) on and turns the switch 64 (S6) off. Then, the capacitor 65 (C2) is charged by the current source 62 (I3). On the contrary, when the signal VC2a or VC2 changes to the signal state that changes the switch S2 to OFF, the logic 61 turns the switch 63 (S5) off and turn the switch 64 (S6) on. Then, the capacitor 65 (C2) is discharged.

The voltage across the capacitor 65 (C2) charged by the current source 62 (I3) is increased and the logic 66 outputs the signal VCc when the voltage across the capacitor 65 (C2) reaches the threshold of the input to the logic 66. The S2 drive circuit 38, to which the signal VCc is fed, turns the switch S2 off. For the period from the time when the switch 63 (S5) is turned on, to the time when the voltage across the capacitor 65 (C2) reaches the threshold of the input to the logic 66, the switch S2 is ON. As the time delay is varied by the current value of the current source 62 (I3) that charges the capacitor 65 (C2), and as the current value is varied by the signal VCb, the time delay, that is the S2 ON-period, is controlled by the value of the signal VCb. When the output current of the current source 62 (I3) is increased by the signal VCb, the velocity, at that the voltage across the capacitor 65 (C2) rises, increases and the time delay becomes short. On the contrary, when the output current of the current source 62 (I3) is decreased by the signal VCb, the velocity, at that the voltage across the capacitor 65 (C2) rises, decreases and the time delay becomes long.

FIG. 9(a) through 9(e) and FIG. 10(a) through 10(e) are block diagrams showing examples of the voltage controlled current source 62 (I3) of FIG. 8. FIG. 9(a) through 9(e) show the examples in which the transconductance of the voltage controlled current source is negative. FIG. 10(a) through 10(e) show the examples in which the transconductance of the voltage controlled current source is positive.

The configurations shown in FIG. 9(a) through 9(d) will be explained below. FIG. 9(a) is a block diagram, in that the voltage controlled current source is configured by a P-channel transistor, to the gate of which the signal VCb is fed.

The voltage controlled current source 62 (I3) of the negative transconductance can be configured only by P-channel transistor as shown in FIG. 9(a). When the transconductance gm of the transistor P1 of FIG. 9(a) is larger than 0, the transconductance Gm of the voltage controlled current source 62 (I3) is given by the following expression (1).

$$Gm = -gm \quad (1)$$

In general, the transconductance gm of a transistor is varied by a drain current or the potential between a gate and a source. Therefore, when it is desirable to keep the transconductance Gm of the voltage controlled current source 62 (I3) is at a constant value, the voltage controlled current source 62 (I3) is configured as shown in FIG. 9(b). In this case, the transconductance Gm is given by the expression (2).

$$Gm = -1/\{R1 + (1/gm)\} \approx -1/R1 \quad (2)$$

When the transconductance gm of the transistor P1 is large enough, the transconductance Gm of the voltage controlled current source 62 (I3) is determined by the value of a resistor R1, and the transconductance Gm can be set arbitrarily by adjusting the value of the resistor R1.

The transconductance gm of the transistor P1 sharply varies near the 0 A point of the drain current. Therefore it is preferable that the voltage controlled current source 62 (I3) is configured as shown in FIGS. 9(c) and 9(d) to reduce the variation of the transconductance Gm of the voltage controlled current source 62 (I3) caused by the change of the transconductance gm of the transistor P1.

Since the configurations shown in FIGS. 9(a) and 9(b) make the current of IB flow to the drain of the transistor P1 even when the output current of the voltage controlled current source 62 (I3) is 0 A, it is possible to prevent the drain current from becoming near 0 A.

In the configuration shown in FIG. 9(d), a DC offset is caused between the input signal VCb and the output current of the transistor P1. The DC offset is caused since the offset voltage R1×IB is caused by the current of IB that flows to the resistor R1 when the output current is 0 A. Therefore, it is necessary to apply the offset voltage additionally to the input voltage VCb.

The offset can be avoided by employing the configuration shown in FIG. 9(e). In the configuration shown in FIG. 9(e), the offset is not caused by the resistor R1, since the current by the current source IB does not flow to the resistor R1 when the output current is 0 A, although the current of IB flows to the transistor P1.

Since the transistor P1 of FIG. 9(a) through 9(e) is replaced to an N-channel transistor N1 in FIG. 10(a) through 10(e), the configurations shown in FIG. 10(a) through 10(e) can be explained in the same manner as the configurations shown in FIG. 9(a) through 9(e). FIG. 10(a) through 10(e), the direction of the signal is changed by providing a current mirror circuit to the output of the voltage controlled current source 62 (I3).

Although, a MOS transistor is used in the configurations of FIG. 9(a) through 9(e) and FIG. 10(a) through 10(e), it is possible to realize the configurations shown in these figures by using a bipolar transistor in place of the MOS transistor. In addition, the transistors may be connected in a cascade when it is desired that the output impedance is made to be high in FIG. 9(a) through 9(e) and FIG. 10(a) through 10(e).

It is explained above that the adjusting quantity for shortening or elongating the ON-period of the switch S2 can be varied by superposing the time signal on the signals VCa1 and VCa2 in the circuit of FIG. 3. Alternatively, the adjusting quantity for shortening or elongating the ON-period of the switch S2 can be varied by setting relationship between the output current of the voltage controlled current source 62 (I3) in FIG. 8 and the input voltage VCb to be nonlinear in place of using the time signal in FIG. 3.

Figure 11:
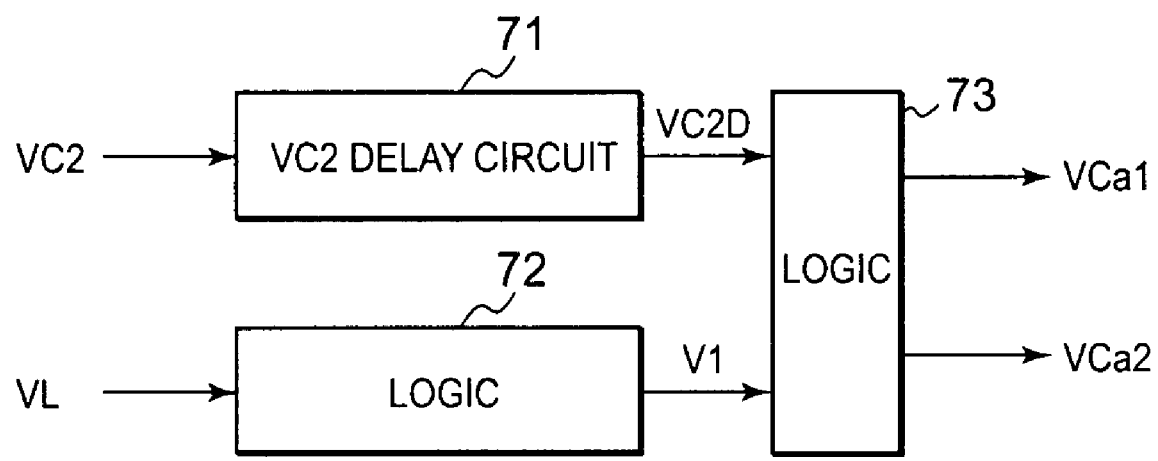
FIG. 11 is a block diagram showing another example of the S2 ON-period decision circuit.

Another example of the S2 ON-period decision circuit 34 will be explained subsequently. FIG. 11 is a block diagram showing another example of the S2 ON-period decision circuit 34. The circuit of FIG. 11 is employed when the voltage VL across an inductor is used in place of the inductor current IL for detecting the polarity of the inductor current IL.

The input to the S2 ON-period decision circuit 34 shown in FIG. 11. The S2 ON-period decision circuit 34 of FIG. 11 includes a VC2 delay circuit 71 that outputs a signal VC2D obtained by shifting the timing at which the signal VC2 changes from HIGH to LOW by TS2D; a logic 72 that generates the signal V1, which becomes HIGH when the inductor voltage VL is not negative, based on the signal VL indicating the value of the inductor voltage VL; and a logic 73 that generates the output signals VCa1 and VCa2 to the S2 ON-period adjusting circuit 35 based on the signal VC2D and the signal V1.

The threshold voltage VTH of the input terminal of the logic 72 is set such that VIN−VOUT<VTH<0 V for the boost converter and such that −VOUT (GND (0V)−VOUT) <VTH<0 for DC-DC converters excluding the boost converter.

FIG. 12(a) through 12(c) are wave charts describing the operational waveforms of the DC-DC converter when the S2 ON-period decision circuit 34 of FIG. 11 is used. FIG. 12(a) describes the operational waveforms of the signals when the ON-period of switch S2 is too long. FIG. 12(b) describes the operational waveforms of the signals when the ON-period of switch S2 is too short. FIG. 12(c) describes the operational waveform of the signals when the ON-period of switch S2 is controlled appropriately in the stationary state.

The operation of the circuit of FIG. 11 will be explained with reference to FIG. 12(a) through 12(c). The VC2 delay circuit 71 of FIG. 11 outputs the signal VC2D obtained by delaying the time when the signal VC2 for switching the switch S2 change from HIGH to LOW, by the period TS2D.

When the ON-period of the switch S2 is too long as shown in FIG. 12(a), the inductor voltage VL changes to 0 V at the time t82, at which the switch S2 turns off. When the signal VL is already 0 V (the signal V1 is HIGH) at the time t83, at which the signal VC2D is changed from HIGH to LOW, the logic 73 determines that the ON-period of the switch S2 is too long and outputs the signals VCa1 and VCa2 indicating the decision consequence. Alternatively, the logic 73 may keep outputting the signals VCa1 and VCa2 indicating the decision consequence determining that the ON-period of the switch S2 is too long during the period (t83−t82)=TS2D from the time when the signal VL changes to 0 V, to the time when the signal VC2D changes from HIGH to LOW.

When the ON-period of the switch S2 is too short as shown in FIG. 12(b), the value of the inductor voltage VL is until the time t94, at which the inductor current IL reaches 0 A. (It is assumed that a diode that applies the inductor current IL to this direction is connected in parallel with the switch S2. When the switch S2 is a MOS transistor, the body diode of the MOS transistor can be used as the above-described diode. When the voltage of the signal VL is negative at the moment (the time t93), at which the signal VC2D changes from HIGH to LOW, the logic 73 determines that the ON-period of switch S2 is too short and the logic 73 outputs the signals VCa1 and VCa2 indicating the decision consequence. Alternatively, the logic 73 may keep outputting the signals VCa1 and VCa2 indicating the decision consequence determining that the ON-period of the switch S2 is too short during the period (t94−t93)=T2 from the time when the signal VC2D changes from HIGH to LOW, to the time when the signal VL changes to 0 V.

In the stationary state, the switch S2 is turned off at the time t102 before the inductor current IL reaches 0 A as shown in FIG. 12(c), since the period from the time when the switch S2 is turned off, to the time when the inductor current IL becomes 0 A, corresponds to the time delay (TS2D) generated by the VC2 delay circuit 71, the period (time difference) from the time when the switch S2 turns off, to the time when the inductor current IL becomes 0 A can be set to be short easily by adjusting the time delay (TS2D).

It is obvious that the HIGH and LOW in each logic signal of FIG. 12(a) through 12(c) can be reversed by preserving the logic consistency. Here, the polarity of inductor current IL is determined based on the inductor voltage VL. The potential of the signal VL that provides the operation reference is different depending on the circuit systems and the signal VL cannot always use the ground potential for the reference of which. Therefore, the S2 ON-period decision circuit 34 can be configured easily, without using any complicated circuit by using a voltage signal, the reference of which is the ground potential, which operates in the same manner as the signal VL. For example, the voltage signal, the reference of which is the ground potential, is obtained by using the voltage across the switch S2 in the case of the buck converter. The voltage signal, the reference of which is the ground potential, is obtained by using the voltage across the switch S1 in the case of the boost converter. The voltage signal, the reference of which is the ground potential, is obtained by using the voltage across the switch 13d (S2), located in the location of the secondary coil 14d-2 of the transformer in FIG. 23, in the case of the flyback converter. It is only necessary to input the voltage across the switch S2 to the signal VL-input terminal of the logic 72 of the circuit shown in FIG. 11 in the case of the buck converter. It is only necessary to input the voltage across the switch S1 to the signal VL-input terminal of the logic 72 in the case of the boost converter. It is only necessary to input the voltage across the switch 13d (S2), the location thereof and the location of the secondary coil 14d-2 of the transformer 16 of the circuit of FIG. 23 are exchanged to each other, to the signal VL-input terminal of the logic 72 of the circuit of FIG. 11 in the case of the flyback converter.

Figure 23:
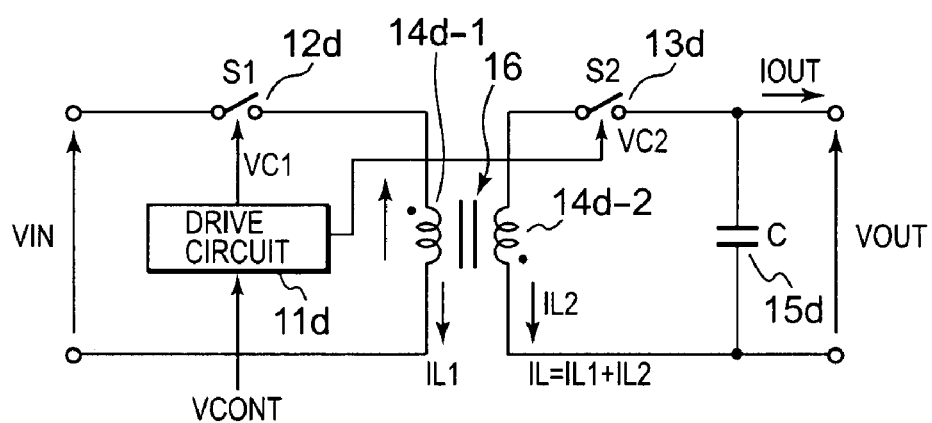
FIG. 23 is a block diagram showing an example where the DC-DC converter is a flyback converter.
Figure 25:
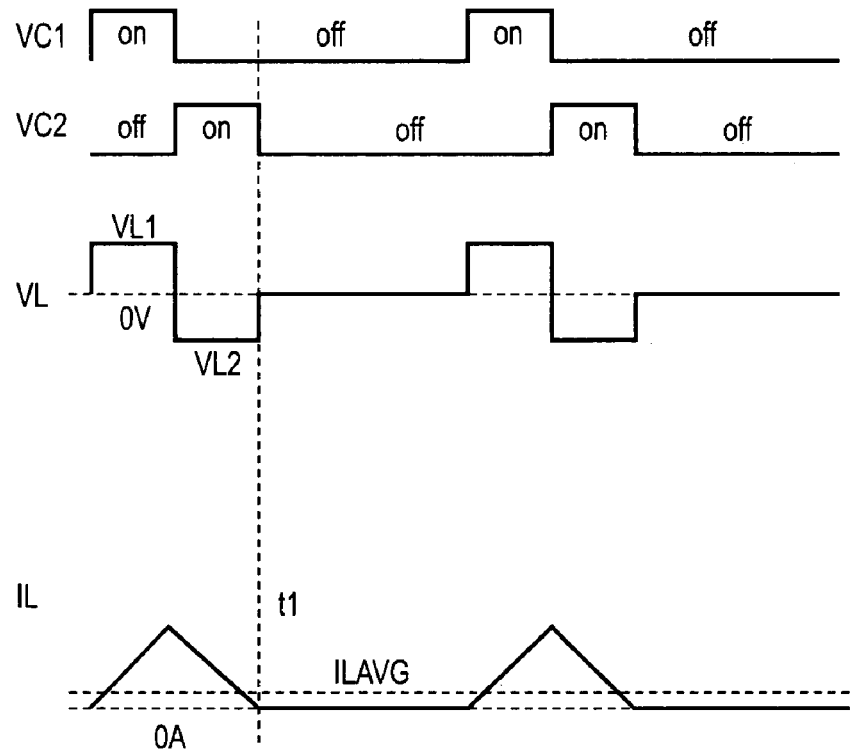
FIG. 25 is a wave chart describing the operational waveforms of the DC-DC converter when a negative current of an inductor is interrupted.

Further the operations described in FIG. 12(a) through 12(c) are facilitated by setting the threshold voltage VTH of the input terminal of the logic 72 in FIG. 11 to be 0<VTH<VOUT in the case of the buck converter, to be VIN<VTH<VOUT in the case of the boost converter, and to be 0<VTH<VOUT in the case of exchanging the location of the secondary coil 14d-2 of the transformer 16 of the circuit of FIG. 23 and the location of the switch 13d (S2) to each other in the flyback converter.

Figure 13A:
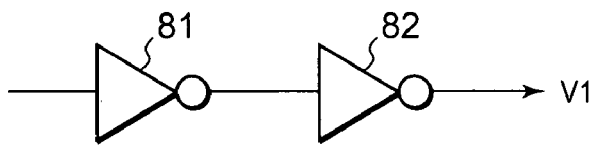
FIG. 13(a) is a block diagram showing an example of a logic 72 of a non-inversion type.
Figure 13B:
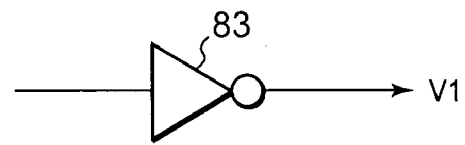
FIG. 13(b) is a block diagram showing an example of the logic 72 of an inversion type.

By setting the threshold of the input terminal, as described above, the logic 72 can be configured by the simple inverter circuit shown in FIG. 13(a) and 13(b). FIG. 13(a) shows the inverter circuit of a non-inversion type, and a non-inverted signal is used for the signal V1. The circuit of FIG. 13(a) is configured by connecting two inverters in series.

FIG. 13(b) shows the inverter circuit of an inversion type, and an inverted signal is used for the signal V1. The circuit of FIG. 13(b) is configured by one inverter. Generally, the input signal of the logic 72 has an oscillatory waveform as shown in FIG. 14(a) during the period during which both the switch S1 and the switch S2 are OFF.

Figures 14A, 14B:
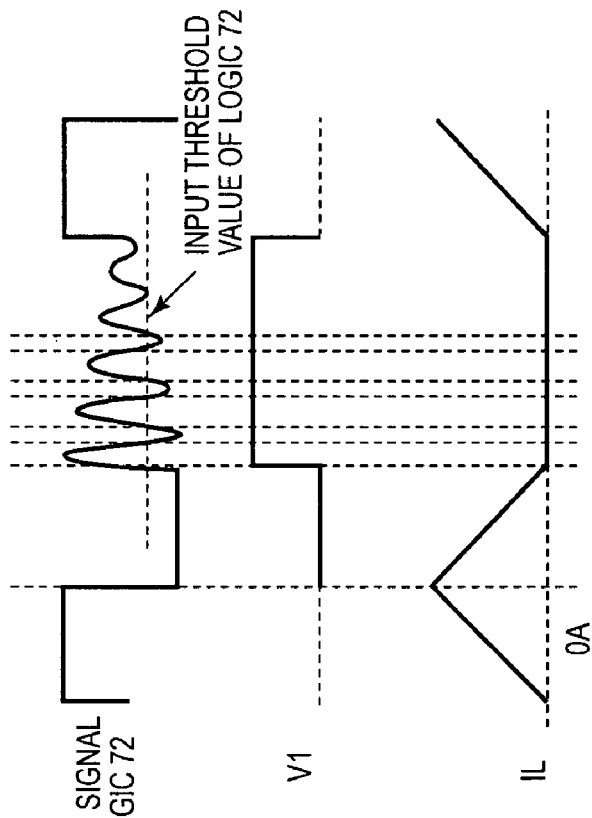
FIG. 14(a) is a wave chart describing the waveforms oscillating when switches S1 and S2 are in an off state thereof and FIG. 14(b) is a wave chart describing the waveforms when a latch circuit is used for the logic 72.

Since the input signal exhibits the oscillatory waveform in FIG. 14(a), the output V1 also exhibits an oscillatory waveform. In the circuit of FIGS. 13(a) and 13(b), the output signal V1 of the logic 72 oscillates, too. The oscillation can be absorbed by the time delay TS2D by the VC2 delay circuit 71. For absorbing the oscillation, it is necessary to set the time delay TS2D to be long.

Figure 15:
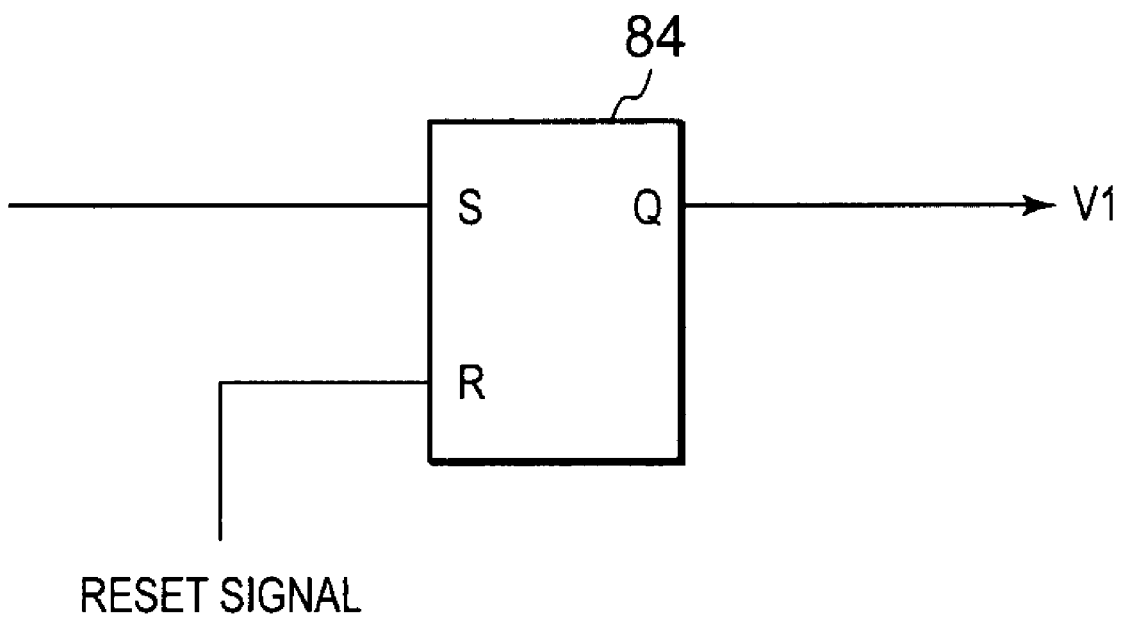
FIG. 15 is a block diagram showing an example of the logic 72 by the latch circuit.

The oscillatory waveform can be prevented from causing by using a latch circuit 84 to the input terminal of the logic 72 as shown in FIG. 15. The Logic 72 is configured by an SR flip-flop circuit 84 in FIG. 15. The reset signal of the SR flip-flop circuit 84 can be generated by regulating the logic of the signal VC1a, the signal VC2a or the signal VC1.

FIG. 14(b) describes the operation in the case of using a latch circuit. As shown in FIG. 14(b), the oscillation of the output signal V1 can be avoided by using the latch, the threshold value of the input thereof is set at the above described value.

Figure 16:
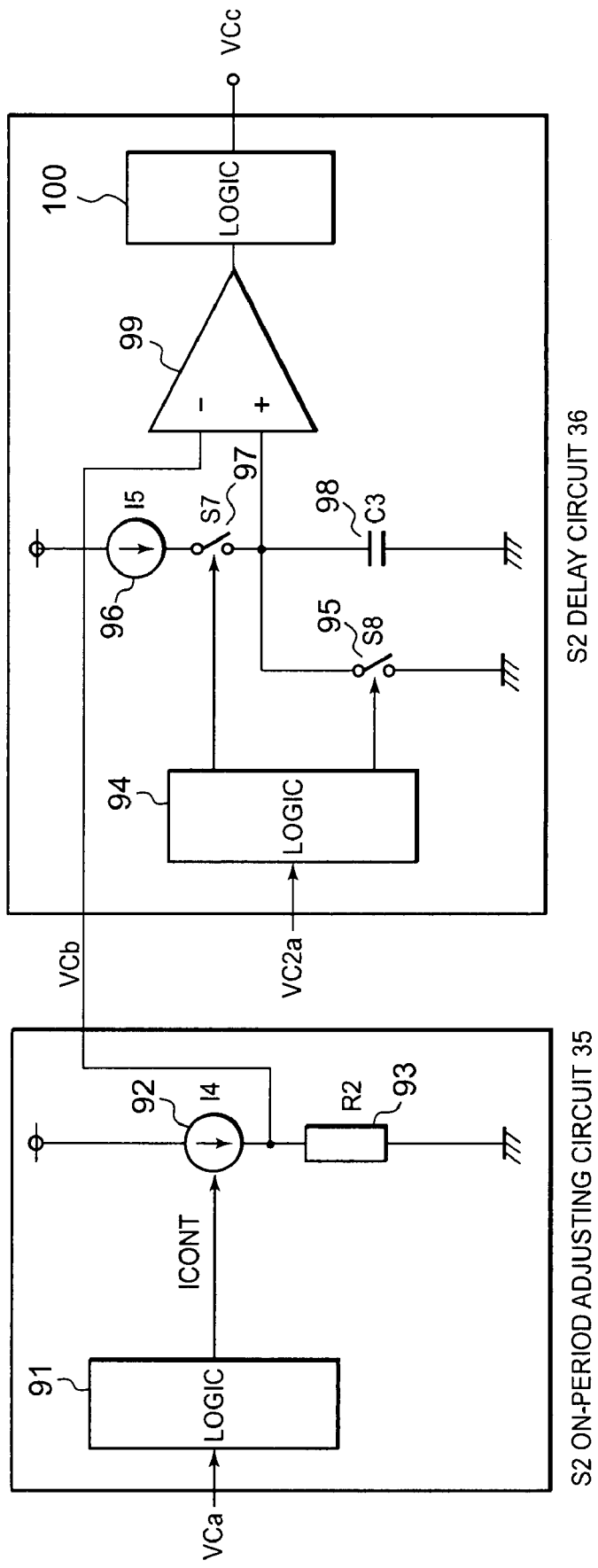
FIG. 16 is a block diagram showing another example of the S2 ON-period adjusting circuit 35 and the S2 delay circuit 36.

Another configuration of the S2 ON-period adjusting circuit 35 will be explained below. FIG. 16 is a block diagram showing another example of the S2 ON-period adjusting circuit 35 and the S2 delay circuit 36.

The S2 ON-period adjusting circuit 35 varies the output current of the current source 92 (I4) by a signal ICONT, which a logic 91 generates from the output signal VCa of the S2 ON-period decision circuit 34, to vary a voltage VCb across a resistor 93 (R2). In the S2 delay circuit 36, a logic 94 turns a switch 97 (S7) off and turns a switch 95 (S8) on based on the signal VC2a during the period for which the switch S2 is OFF or the switch S1 is ON, and discharges the capacitor 98 (C3) to set the voltage across a capacitor 98 (C3) at 0 V.

As the signal VC2a or VC2 shifts to the state for switching the switch S2 to be ON, the logic 94 turns a switch 97 (S7) on and turns a switch 95 (S8) off to discharge the capacitor 98 (C3) with the output current of a current source 96 (I5).

Since the capacitor 98 (C3) is charged by the current source 96 (I5), the voltage across the capacitor 98 (C3) rises. As the voltage across the capacitor 98 (C3) reaches the level of the signal VCb, the output signal of a comparator 99 changes from LOW to HIGH. In response to the level change of the output signal from the comparator a logic 100 outputs a signal VCc. The S2 drive circuit 38, to which the signal VCc is fed turns the switch S2 off.

The time delay caused by charging the capacitor 98 (C3) (the time delay from the time when the signal for changing the switch S2 from OFF to ON is generated, to the time when the signal VCc is generated,) becomes the period, during which the switch S2 is ON. The time delay varies depending on the value of the signal VCb, and the signal VCb is adjusted by the output current of the current source 92 (I4) controlled by the signal ICONT.

For example, when the ON-period of the switch S2 is too long, the signal VCb is decreased by setting the output current of the current source 92 (I4) to be small. By this operation, the voltage (=VCb) of the capacitor 98 (C3) for changing the output signal of the comparator 99 from LOW to HIGH decreases and the time delay is shortened. By this operation, the ON-period of the switch S2 in the next period is shortened.

In addition, the voltage level of the signal VCb is raised by increasing the output current of the current source 92 (I4) when the ON-period of the switch S2 is too short. By this operation, the voltage (=VCb) of the capacitor 98 (C3) for changing the output signal of the comparator 99 rises and the time delay is elongated. The ON-period of the switch S2 in the next period is extended by this operation.

The S2 ON-period adjusting circuit 35 of FIG. 16 facilitates using a multi-step voltage signal or a continuous voltage signal for the signal ICONT fed from the logic 91, and configuring the current source 92 (I4) by a voltage controlled current source.

Figure 17:
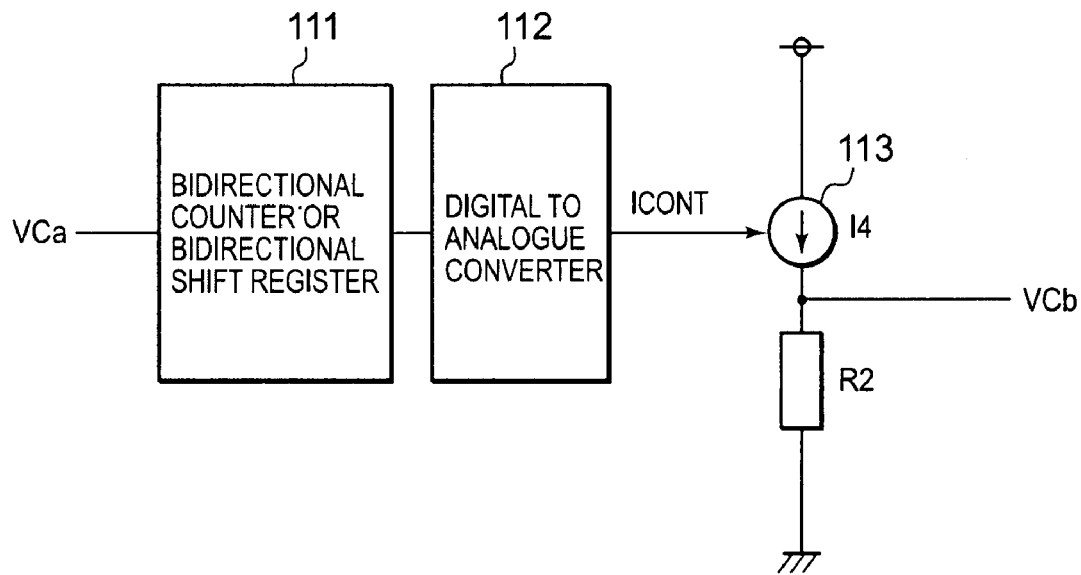
FIG. 17 is a block diagram showing a first example of a digitized S2 ON-period adjusting circuit.

An example of the S2 ON-period adjusting circuit described above is shown in FIG. 17. In the example of FIG. 17, the logic 91 of FIG. 16 is configured by a bidirectional counter or a bidirectional shift register 111 and an digital to analog converter 112.

In this configuration, when the signal VCa is a signal indicating that the inductor current is positive, the bidirectional counter 111 or the bidirectional shift register 111 counts a specified quantity up (the left shift, that is the operation that makes data in the bidirectional shift register 111 large). When the signal VCa is a signal indicating that the inductor current is negative, the bidirectional counter 111 or the bidirectional shift register 111 counts value of the specified quantity down (the right shift, that is the operation that makes data in the bidirectional shift register 111 small). The output from the bidirectional counter 111 or the bidirectional shift register 111 is converted by a digital-to-analogue converter (DAC) 112, and fed to a voltage controlled current source 113 (I4) to control the output current value thereof.

The voltage controlled current source 113 (I4) of FIG. 17 can be realized by the configuration shown in FIGS. 9 and 10. Although a MOS transistor is used in FIGS. 9 and 10, a bipolar transistor may be used alternatively.

When any of the circuits shown in FIG. 9(a) through 9(e) and FIG. 10(a) through 10(e) is used for the voltage controlled current source 113 (I4), the transistors may be connected in cascade to increase the output impedance. Here, the relationship between the height of the signal ICONT and the value of the output current of the voltage controlled current source 113 (I4) may be reversed by preserving the matching with other parts.

In the S2 ON-period adjusting circuit 35 of FIG. 16, the current source 92 (I4) is configured by connecting a plurality of current sources having switches for operating or for stopping the current sources in parallel to each other. By forming the signal ICONT of a logic signal having a plurality of bits and by controlling the number of the current sources to be operated among a plurality of the current sources with the signal ICONT, the output current can be adjusted.

Figure 18:
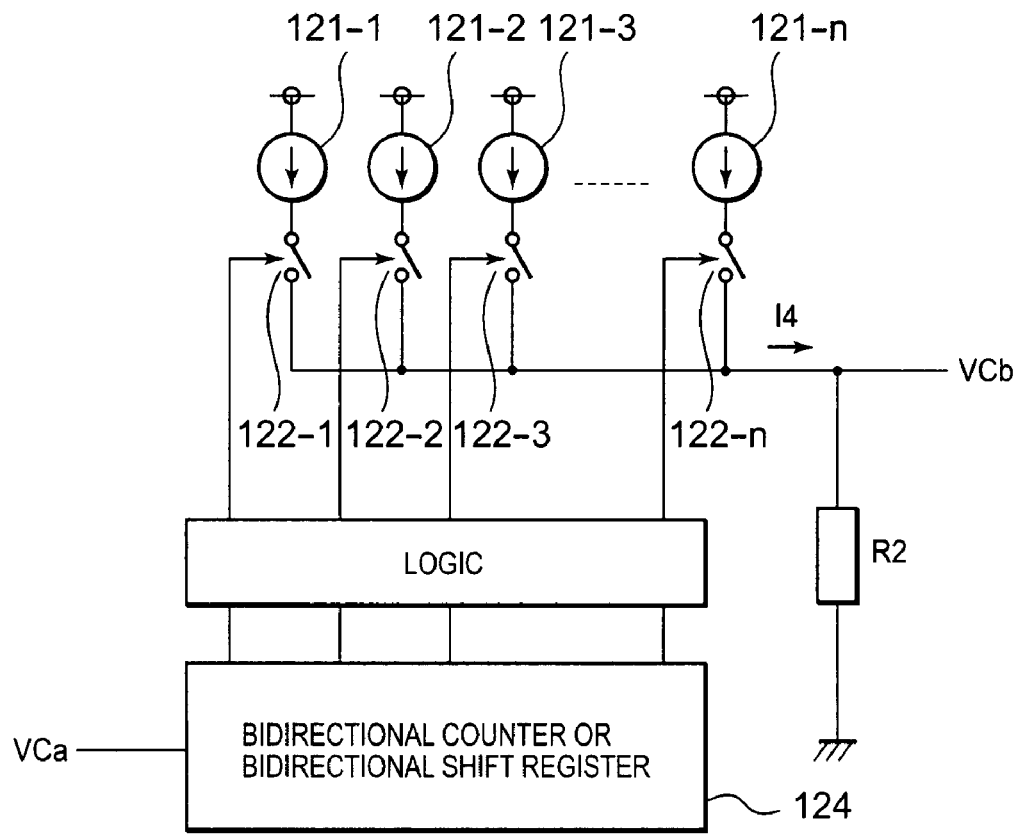
FIG. 18 is a block diagram showing a second example of a digitized S2 ON-period adjusting circuit.
Figure 19:
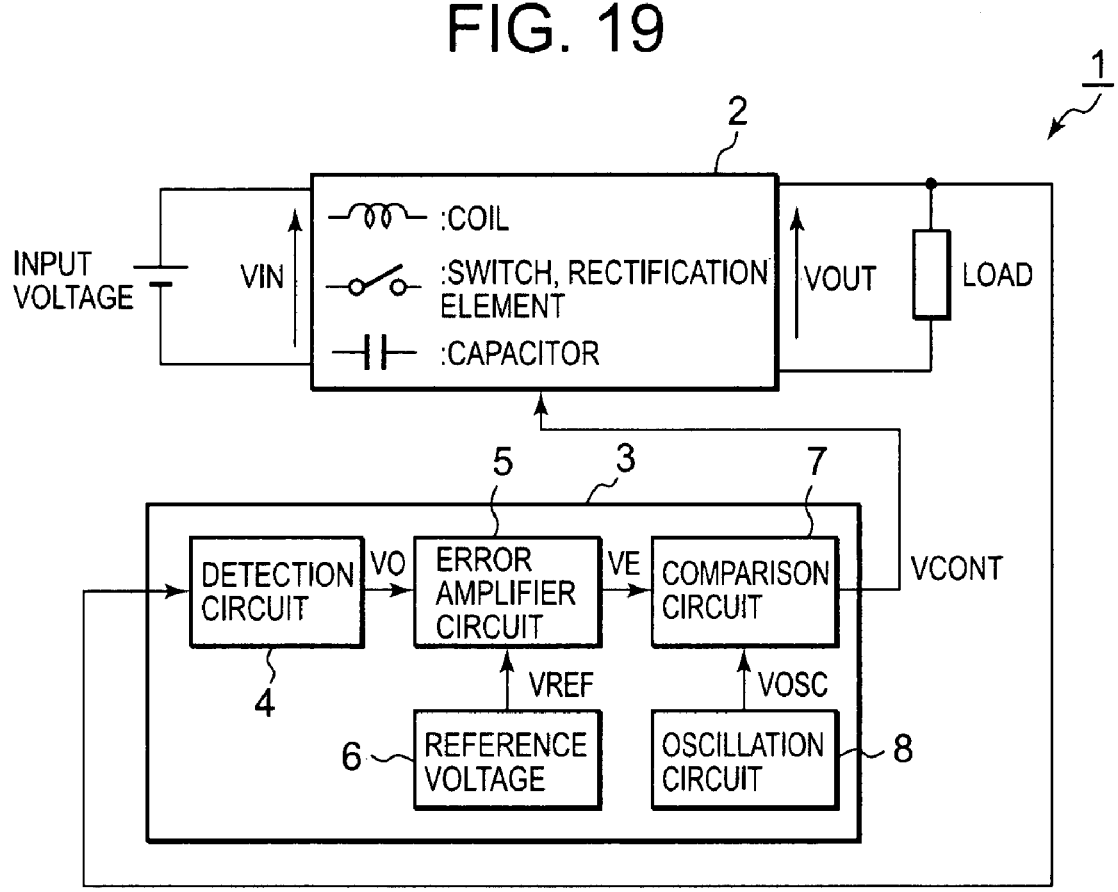
FIG. 19 is a block diagram showing the configuration of a general DC-DC converter.

A configuration for realizing the above-described scheme is shown in FIG. 18. In FIG. 18, the S2 ON-period adjusting circuit includes a plurality of current sources 121-1 through 121-n connected in parallel; switches 122-1 through 122-n for switching the current sources 121-1 through 121-n; a bidirectional counter 124 or a bidirectional shift registers 124 that counts the value of the specified quantity up (the left shift) when the signal VCa indicates that the inductor current is positive and counts the value of the specified quantity down (the right shift) when the signal VCa indicates that the inductor current is negative; and a logic 123 which changes over the ON and OFF of the switches 121-1 through 121-n based on the output value of the bidirectional counter 124 or the bidirectional shift register 124.

As the bidirectional counter 124 or the bidirectional shift register 124 changes the output value based on the signal VCa in the configuration shown in FIG. 18, a certain number of the current sources 121-1 through 121-n, the number being determined based on the output value, is connected by the switches 121-1 through 121-n to change the current I4, and the voltage VCb across a resistor R2 based on the current 14 is output to the S2 delay circuit 36.

Since various kinds of adjustment such as operating point adjustment and bias adjustment necessary for an analog circuit become needless when a part of the configuration of the S2 ON-period adjusting circuit 35 is digitized in the same manner as the configuration of FIGS. 17 and 18, it is easy to design and to configure the circuit. However, the analog circuit configuration is smaller than the analog and digital circuit configuration, and faster in operational speed than the analog and digital circuit configuration. Therefore, an appropriate DC-DC converter can be realized by selecting any of the circuit configurations described above, considering the environment in which the DC-DC converter is used.

It will of course be realized by those skilled in the art that variations are possible and that the invention may be practiced otherwise than as specifically described herein without departing from the scope thereof.

What is claimed is:

1. A control circuit that controls a DC-DC converter of a synchronous rectifier type including an inductor or a transformer, the control circuit comprising:
an ON-period decision part that determines whether an ON-period of a synchronous rectifier switch of the DC-DC converter is too long or too short;
an ON-period adjustment part that generates an adjusting signal to adjust the ON-period during which the synchronous rectifier switch is ON based on a decision of the ON-period decision part; and
a first delay part that adjusts a length of a delay from a first time, when a rectifier changeover signal, which changes the synchronous rectifier switch between ON and OFF states, turns the synchronous rectifier switch on, to a second time, when the rectifier changeover signal turns the synchronous rectifier switch off forcibly, wherein the first delay part comprises:
a third current source that outputs an output value that varies according to the adjusting signal, the third current source comprising a FET including a gate to which the adjusting signal is fed,
a third switch that changes the third current source between ON and OFF states based on a first changeover signal,
a second capacitor connected between the third switch and ground,
a fourth switch that connects a connecting point of the third switch and the second capacitor to ground based on a second changeover signal,
a fourth logic part that generates, using an input signal of a drive circuit of the synchronous rectifier switch as an input thereof, the first changeover signal and the second changeover signal, and
a fifth logic part that generates an output signal that forcibly turns off the synchronous rectifier switch based on a voltage across the second capacitor.

2. The control circuit according to claim 1, wherein the ON-period decision part determines that the ON-period of the synchronous rectifier switch is too long if an inductor current flowing through the inductor or the transformer is negative when the synchronous rectifier switch turns off.

3. The control circuit according to claim 1, wherein the ON-period decision part determines that the ON-period of the synchronous rectifier switch is too short if the inductor current flowing through the inductor or the transformer is positive when the synchronous rectifier switch turns off.

4. The control circuit according to claim 1, wherein the ON-period decision part comprises
a comparator that compares an inductor current flowing through the inductor or the transformer with a reference value, and
a first logic part that generates a signal indicating that the ON-period of the synchronous rectifier switch is too long or too short based on an output from the comparator and the rectifier changeover signal.

5. The control circuit according to claim 4, wherein the ON-period decision part comprises a timer circuit that detects a period from a third time, when the inductor current becomes negative, to a fourth time, when the synchronous rectifier switch turns off or a period from a fifth time, when the synchronous rectifier switch turns off, to a sixth time, when the inductor current becomes zero.

6. The control circuit according to claim 5, wherein the timer circuit comprises
an AND circuit, to which an output of the comparator and the changeover signal are fed, and
a NOR circuit, to which the output of the comparator and the changeover signal are fed.

7. The control circuit according to claim 1, wherein the ON-period decision part comprises
a comparator that compares a voltage value across a resistor connected in series with the inductor or an output side coil of the transformer, and
a first logic part that generates a signal indicating that the ON-period of the synchronous rectifier switch is too long or too short based on an output from the comparator and the rectifier changeover signal.

8. The control circuit according to claim 1, wherein the ON-period decision part comprises
a comparator that compares a voltage value across a resistor connected in series to the synchronous rectifier switch, and
a first logic part that generates a signal indicating that the ON-period of the synchronous rectifier switch is too long or too short based on an output from the comparator and the rectifier changeover signal.

9. The control circuit according to claim 1, wherein the ON-period decision part comprises
a second delay part that outputs a signal that delays a timing at which the changeover signal turns the synchronous rectifier switch OFF by a specified time,
a second logic part that outputs a signal that changes when an inductor voltage becomes 0 V from a negative voltage based on a signal showing a value of the inductor voltage, and
a third logic part that generates an output signal to the ON-period adjusting circuit based on an output of the second delay part and an output of the second logic part.

10. The control circuit according to claim 9, wherein the second logic part comprises an inverter.

11. The control circuit according to claim 9, wherein the second logic part comprises a latch circuit.

12. The control circuit according to claim 11, wherein the latch circuit comprises an SR flip-flop circuit.

13. The control circuit according to claim 1, wherein the ON-period adjustment part comprises
a first current source,
a first switch that changes the first current source between ON and OFF states based on an output from the ON-period decision part,
a second current source connected in series between the first current source and ground,
a second switch that changes the second current source between ON and OFF states based on the output from the ON-period decision part,
a first capacitor connected between ground and a connecting point of the first switch and the second switch, and
a first output portion that outputs a voltage across the first capacitor.

14. The control circuit according to claim 1, wherein the FET is a P channel FET.

15. The control circuit according to claim 1, wherein the FET is an N channel FET comprising a source, to which a current mirror circuit is connected.

16. The control circuit according to claim 1, wherein the ON-period adjustment part comprises
a plurality of sixth current sources connected in parallel,
a plurality of seventh switches that change each of the sixth current sources between ON and OFF states based on a fifth changeover signal,
a bidirectional counter or a bidirectional shift register, to which the output of the ON-period decision part is fed,
a ninth logic part that generates the fifth changeover signal from an output of the bidirectional counter or the bidirectional shift register, and
an output portion that converts an output current from the sixth current source into a voltage value and outputs the voltage value.

17. A DC-DC converter including the control circuit described in claim 1.

18. The DC-DC converter according to claim 17, wherein the DC-DC converter is a buck converter.

19. The DC-DC converter according to claim 17, wherein the DC-DC converter is a boost converter.

20. The DC-DC converter according to claim 17, wherein the DC-DC converter is a buck-boost converter.

21. The DC-DC converter according to claim 17, wherein the DC-DC converter is a flyback converter.

22. A control circuit that controls a DC-DC converter of a synchronous rectifier type including an inductor or a transformer, the control circuit comprising:
an ON-period decision part that determines whether an ON-period of a synchronous rectifier switch of the DC-DC converter is too long or too short,
an ON-period adjustment part that generates an adjusting signal to adjust the ON-period during which the synchronous rectifier switch is ON based on a decision of the ON-period decision part, wherein the ON-period adjustment part comprises:
a fourth current source that varies an output current based on a current control signal,
a sixth logic part that generates a current control signal from an output of the ON-period decision part, and
a second output portion that converts an output current of the fourth current source to a voltage value, and outputs the voltage value as the adjusting signal; and
a first delay part that adjusts a length of a delay from a first time, when a rectifier changeover signal, which changes the synchronous rectifier switch between ON and OFF states, turns the synchronous rectifier switch on, to a second time, when the rectifier changeover signal turns the synchronous rectifier switch off forcibly, wherein the first delay part comprises:
a fifth current source,
a fifth switch that changes the fifth current source between ON and OFF states based on a third changeover signal,
a third capacitor connected between the fifth switch and ground,
a sixth switch that connects a connecting point of the fifth switch and the third capacitor to ground based on a fourth changeover signal,
a seventh logic part that generates the third changeover signal and the fourth changeover signal based on an input signal of a drive circuit of the synchronous rectifier switch,
a second comparator that compares the adjusting signal with a voltage across the third capacitor, and
an eighth logic part that generates an output signal that forcibly turns the synchronous rectifier switch off based on an output of the second comparator.

23. The control circuit according to claim 22, wherein the sixth logic part comprises
a bidirectional counter or a bidirectional shift register, to which the output of the ON-period decision part is fed, and
a digital to analog conversion part that converts an output of the bidirectional counter or the bidirectional shift register to an analog signal.

24. A control method of a DC-DC converter of a synchronous rectifier type, the method comprising the steps of:
determining whether an ON-period of a synchronous rectifier switch of the DC-DC converter is too long or too short,
generating an adjusting signal to adjust the ON-period during which the synchronous rectifier switch is ON based on a result of the step of determining whether the ON-period is too long or too short,
adjusting a length of a delay from a first time, when a rectifier changeover signal, which changes the synchronous rectifier switch between ON and OFF states, turns the synchronous rectifier switch on, to a second time, when the rectifier changeover signal turns the synchronous rectifier switch off forcibly, the step of adjusting the length of the delay further including:
outputting an output value of a current source according to the adjusting signal;
generating first and second changeover signals from an input signal of a drive circuit of the synchronous rectifier switch;
turning the current source ON and OFF according to the first changeover signal;
charging a capacitor, and subsequently discharging the capacitor according to the second changeover signal;
comparing the adjusting signal with a voltage across the capacitor; and
turning the synchronous rectifier switch off according to a result of the comparing step.

\* \* \* \* \*